United States Patent
Grigg et al.

(10) Patent No.: US 9,819,680 B2
(45) Date of Patent: *Nov. 14, 2017

(54) DETERMINING USER AUTHENTICATION REQUIREMENTS BASED ON THE CURRENT LOCATION OF THE USER IN COMPARISON TO THE USERS'S NORMAL BOUNDARY OF LOCATION

(71) Applicant: BANK OF AMERICA CORPORATION, Charlotte, NC (US)

(72) Inventors: David M. Grigg, Rock Hill, SC (US); Peter John Bertanzetti, Charlotte, NC (US); Charles Jason Burrell, Middleburg, FL (US); Carrie Anne Hanson, Charlotte, NC (US); Joseph Neil Johansen, Rock Hill, SC (US); Michael E. Toth, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/876,651

(22) Filed: Oct. 6, 2015

(65) Prior Publication Data

US 2016/0026779 A1   Jan. 28, 2016

Related U.S. Application Data

(63) Continuation of application No. 14/175,643, filed on Feb. 7, 2014, now Pat. No. 9,208,301.

(51) Int. Cl.
*H04L 29/06* (2006.01)
*G06F 21/31* (2013.01)

(52) U.S. Cl.
CPC .......... *H04L 63/0876* (2013.01); *G06F 21/31* (2013.01); *G06F 2221/2111* (2013.01); *G06F 2221/2137* (2013.01)

(58) Field of Classification Search
CPC ................................. H04L 63/0876
See application file for complete search history.

(56) References Cited

U.S. PATENT DOCUMENTS

| | | | |
|---|---|---|---|
| 3,256,670 A | 6/1966 | Tersigni | |
| 3,261,093 A | 7/1966 | Reswick | |

(Continued)

FOREIGN PATENT DOCUMENTS

| | | |
|---|---|---|
| EP | 1132876 A2 | 9/2001 |
| WO | WO 2012058099 | 5/2012 |
| WO | WO 2013095486 | 6/2013 |

OTHER PUBLICATIONS

European Patent Application No. 01400506 filed on Feb. 28, 2001, and printed as document No. EP 1132876 A2 entitled "Electronic Wallet System with Secure Inter-purse Operations" by inventor Tang-Talpin et al.

(Continued)

*Primary Examiner* — Oleg Korsak
*Assistant Examiner* — Simon Kanaan
(74) *Attorney, Agent, or Firm* — Michael A. Springs; Moore & Van Allen PLLC; James C. Edwards

(57) ABSTRACT

Systems, apparatus, methods, and computer program products are provided for determining a user's authentication requirements/credentials for a specific network access session based on the current location of the user in comparison to known boundaries of location associated with the user, such as patterns of movement or the like. As such, the present invention serves to expedite the process for authenticating a user who desires to gain access to a network service, such as a banking application or the like.

15 Claims, 6 Drawing Sheets

(56) References Cited

U.S. PATENT DOCUMENTS

| | | |
|---|---|---|
| 3,295,812 A | 1/1967 | Schneider et al. |
| 3,295,898 A | 1/1967 | Finzel |
| 3,307,412 A | 3/1967 | Granqvist |
| 3,352,730 A | 11/1967 | Murch |
| 4,766,293 A | 8/1988 | Boston |
| 5,437,346 A | 8/1995 | Dumont |
| 5,438,186 A | 8/1995 | Nair et al. |
| 6,119,103 A | 9/2000 | Basch et al. |
| 6,226,752 B1 | 5/2001 | Gupta et al. |
| 6,254,000 B1 | 7/2001 | Degen et al. |
| 6,256,670 B1 | 7/2001 | Davies |
| 6,330,546 B1 | 12/2001 | Gopinathan et al. |
| 6,422,462 B1 | 7/2002 | Cohen |
| 6,516,056 B1 | 2/2003 | Justice et al. |
| 6,651,168 B1 | 11/2003 | Kao et al. |
| 6,658,393 B1 | 12/2003 | Basch et al. |
| 6,718,328 B1 | 4/2004 | Norris |
| 6,748,367 B1 | 6/2004 | Lee |
| 7,058,806 B2 | 6/2006 | Smeets et al. |
| 7,111,323 B1 | 9/2006 | Bhatia et al. |
| 7,136,835 B1 | 11/2006 | Flitcroft et al. |
| 7,177,838 B1 | 2/2007 | Ling |
| 7,231,202 B2 | 6/2007 | Natsuno |
| 7,239,226 B2 | 7/2007 | Berardi et al. |
| 7,328,189 B2 | 2/2008 | Ling |
| 7,337,144 B1 | 2/2008 | Blinn et al. |
| 7,373,515 B2 | 5/2008 | Owen et al. |
| 7,398,250 B2 | 7/2008 | Blinn et al. |
| 7,472,081 B1 | 12/2008 | Cason |
| 7,529,741 B2 | 5/2009 | Aravamudan et al. |
| 7,546,276 B2 | 6/2009 | Randle et al. |
| 7,596,530 B1 | 9/2009 | Glasberg |
| 7,599,287 B2 | 10/2009 | Testa et al. |
| 7,606,560 B2 | 10/2009 | Labrou et al. |
| 7,610,040 B2 | 10/2009 | Cantini et al. |
| 7,627,505 B2 | 12/2009 | Yoshida et al. |
| 7,657,489 B2 | 2/2010 | Stambaugh |
| 7,693,771 B1 | 4/2010 | Zimmerman et al. |
| 7,697,920 B1 | 4/2010 | McClain |
| 7,698,221 B2 | 4/2010 | Blinn et al. |
| 7,698,443 B2 | 4/2010 | Yaffe et al. |
| 7,716,180 B2 | 5/2010 | Vermeulen et al. |
| 7,738,382 B2 | 6/2010 | Le Faucheur et al. |
| 7,739,169 B2 | 6/2010 | Hammad |
| 7,742,967 B1 | 6/2010 | Keresman, III et al. |
| 7,783,281 B1 | 8/2010 | Cook et al. |
| 7,784,684 B2 | 8/2010 | Labrou et al. |
| 7,835,960 B2 | 11/2010 | Breck et al. |
| 7,848,980 B2 | 12/2010 | Carlson |
| 7,930,264 B2 | 4/2011 | Geppert |
| 7,988,045 B2 | 8/2011 | Connell, II et al. |
| 7,992,779 B2 | 8/2011 | Phillips et al. |
| 8,012,219 B2 | 9/2011 | Mendez et al. |
| 8,032,932 B2 | 10/2011 | Speyer et al. |
| 8,156,335 B2 | 4/2012 | Lin |
| 8,165,945 B2 | 4/2012 | Collins et al. |
| 8,171,531 B2 | 5/2012 | Buer |
| 8,201,232 B2 | 6/2012 | Zhang et al. |
| 8,214,650 B2 | 7/2012 | Dickinson et al. |
| 8,244,210 B2 | 8/2012 | Ayanamcottil et al. |
| 8,249,805 B2 | 8/2012 | de Silva et al. |
| 8,261,093 B1 | 9/2012 | Dhesi et al. |
| 8,270,995 B1 | 9/2012 | Manroa et al. |
| 8,286,227 B1 | 10/2012 | Zheng |
| 8,295,812 B1 | 10/2012 | Jones |
| 8,295,898 B2 | 10/2012 | Ashfield et al. |
| 8,307,412 B2 | 11/2012 | Ozzie et al. |
| 8,307,413 B2 | 11/2012 | Smadja et al. |
| 8,327,428 B2 | 12/2012 | Bailey et al. |
| 8,327,429 B2 | 12/2012 | Speyer et al. |
| 8,332,272 B2 | 12/2012 | Fisher |
| 8,340,981 B1 | 12/2012 | Cave |
| 8,346,666 B2 | 1/2013 | Lindelsee et al. |
| 8,352,323 B2 | 1/2013 | Fisher |
| 8,352,730 B2 | 1/2013 | Giobbi |
| 8,369,833 B2 | 2/2013 | McClain |
| 8,380,177 B2 | 2/2013 | Laracey |
| 8,395,242 B2 | 3/2013 | Oliver et al. |
| 8,407,142 B1 | 3/2013 | Griggs |
| 8,412,626 B2 | 4/2013 | Hirson et al. |
| 8,423,466 B2 | 4/2013 | Lane |
| 8,426,884 B2 | 4/2013 | Mizutani et al. |
| 8,442,915 B2 | 5/2013 | Takatori et al. |
| 8,483,194 B1 | 7/2013 | Wu et al. |
| 8,483,663 B1 | 7/2013 | Jones |
| 8,485,438 B2 | 7/2013 | Dollard |
| 8,498,940 B2 | 7/2013 | Pelegero et al. |
| 8,522,039 B2 | 8/2013 | Hyndman et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,595,812 B2 | 11/2013 | Bomar et al. |
| 8,601,602 B1 | 12/2013 | Zheng |
| 8,602,602 B2 | 12/2013 | Anaokar et al. |
| 8,620,790 B2 | 12/2013 | Priebatsch |
| 8,637,133 B2 | 1/2014 | Vagliardo |
| 8,644,506 B2 | 2/2014 | Zenner |
| 8,650,757 B2 | 2/2014 | Rode |
| 8,660,358 B1 | 2/2014 | Bergboer et al. |
| 8,665,991 B2 | 3/2014 | Zhu et al. |
| 8,682,802 B1 | 3/2014 | Kannanari |
| 8,683,571 B2 | 3/2014 | Zapata et al. |
| 8,732,814 B2 | 5/2014 | Radhakrishnan et al. |
| 8,744,968 B1 | 6/2014 | Grigg et al. |
| 8,768,838 B1 | 7/2014 | Hoffman |
| 8,769,270 B2 | 7/2014 | Orsini et al. |
| 8,788,333 B2 | 7/2014 | Alba et al. |
| 8,788,429 B2 | 7/2014 | Tieken |
| 8,789,162 B2 | 7/2014 | Radhakrishnan |
| 8,839,383 B2 | 9/2014 | Van Horn |
| 8,850,575 B1 | 9/2014 | Magi Shaashua et al. |
| 8,869,241 B2 | 10/2014 | Davis et al. |
| 8,869,305 B1 | 10/2014 | Huang |
| 8,881,306 B2 | 11/2014 | Feldman et al. |
| 8,930,271 B1 | 1/2015 | Ellis et al. |
| 8,943,574 B2 | 1/2015 | Bailey et al. |
| 8,973,102 B2 | 3/2015 | Jakobsson |
| 8,985,442 B1 | 3/2015 | Zhou et al. |
| 8,996,423 B2 | 3/2015 | Johnson et al. |
| 8,997,215 B2 | 3/2015 | Srinivas et al. |
| 9,055,053 B2 | 6/2015 | Radhakrishnan et al. |
| 9,069,943 B2 | 6/2015 | Radhakrishnan et al. |
| 9,131,443 B2 | 9/2015 | Takaki |
| 9,146,345 B1 | 9/2015 | Dong et al. |
| 9,185,101 B2 | 11/2015 | Grigg et al. |
| 9,185,117 B2 | 11/2015 | Grigg et al. |
| 9,196,188 B2 | 11/2015 | Kimura |
| 9,200,154 B2 | 12/2015 | Teramoto et al. |
| 9,208,301 B2 | 12/2015 | Grigg et al. |
| 9,213,814 B2 | 12/2015 | Grigg et al. |
| 9,213,974 B2 | 12/2015 | Votaw et al. |
| 9,223,951 B2 | 12/2015 | Grigg et al. |
| 9,238,674 B2 | 1/2016 | Manoj et al. |
| 9,275,278 B2 | 3/2016 | Liu et al. |
| 9,286,450 B2 | 3/2016 | Grigg et al. |
| 9,305,149 B2 | 4/2016 | Grigg et al. |
| 9,313,190 B2 | 4/2016 | Grigg et al. |
| 9,317,673 B2 | 4/2016 | Grigg et al. |
| 9,317,674 B2 | 4/2016 | Grigg et al. |
| 9,331,994 B2 | 5/2016 | Grigg et al. |
| 9,379,586 B2 | 6/2016 | Rahman et al. |
| 9,390,242 B2 | 7/2016 | Grigg et al. |
| 9,400,005 B2 | 7/2016 | Osborn et al. |
| 2001/0049711 A1 | 12/2001 | Nishihara |
| 2002/0077978 A1 | 6/2002 | O'Leary et al. |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta |
| 2003/0004866 A1 | 1/2003 | Huennekens et al. |
| 2003/0045328 A1 | 3/2003 | Natsuno |

(56) References Cited

U.S. PATENT DOCUMENTS

| | | |
|---|---|---|
| 2003/0061170 A1 | 3/2003 | Uzo |
| 2003/0065805 A1 | 4/2003 | Barnes, Jr. |
| 2003/0105714 A1 | 6/2003 | Alarcon-Luther |
| 2003/0163708 A1 | 8/2003 | Tang |
| 2003/0163787 A1 | 8/2003 | Hay et al. |
| 2005/0119978 A1 | 6/2005 | Ates |
| 2005/0222961 A1 | 10/2005 | Staib et al. |
| 2006/0030333 A1 | 2/2006 | Ward et al. |
| 2006/0036868 A1 | 2/2006 | Cicchitto |
| 2006/0223518 A1 | 10/2006 | Haney |
| 2006/0287004 A1 | 12/2006 | Fuqua |
| 2007/0055594 A1 | 3/2007 | Rivest et al. |
| 2007/0094152 A1 | 4/2007 | Bauman et al. |
| 2007/0100773 A1 | 5/2007 | Wallach |
| 2007/0113275 A1 | 5/2007 | Khanna et al. |
| 2007/0156842 A1 | 7/2007 | Vermeulen et al. |
| 2007/0168677 A1 | 7/2007 | Kudo et al. |
| 2007/0194884 A1 | 8/2007 | Didier |
| 2007/0219984 A1 | 9/2007 | Aravamudan et al. |
| 2007/0223706 A1 | 9/2007 | Gantman |
| 2007/0250920 A1 | 10/2007 | Lindsay |
| 2007/0276764 A1 | 11/2007 | Mann et al. |
| 2007/0277232 A1 | 11/2007 | Cates et al. |
| 2008/0109319 A1 | 5/2008 | Foss |
| 2008/0162338 A1 | 7/2008 | Samuels et al. |
| 2008/0162589 A1 | 7/2008 | Rodeheffer et al. |
| 2008/0167965 A1 | 7/2008 | Von Nothaus |
| 2008/0189210 A1 | 8/2008 | Sawhney |
| 2008/0195499 A1 | 8/2008 | Meredith et al. |
| 2008/0275748 A1 | 11/2008 | John |
| 2008/0293397 A1 | 11/2008 | Gajdos et al. |
| 2008/0319889 A1 | 12/2008 | Hammad |
| 2009/0006230 A1 | 1/2009 | Lyda et al. |
| 2009/0019534 A1 | 1/2009 | Bakshi et al. |
| 2009/0048953 A1 | 2/2009 | Hazel et al. |
| 2009/0057396 A1 | 3/2009 | Barbour et al. |
| 2009/0075630 A1 | 3/2009 | Mclean |
| 2009/0076965 A1 | 3/2009 | Elson et al. |
| 2009/0100529 A1 | 4/2009 | Livnat et al. |
| 2009/0117883 A1 | 5/2009 | Coffing et al. |
| 2009/0119190 A1 | 5/2009 | Realini |
| 2009/0150286 A1 | 6/2009 | Barton |
| 2009/0164327 A1 | 6/2009 | Bishop et al. |
| 2009/0187492 A1 | 7/2009 | Hammad et al. |
| 2009/0199264 A1 | 8/2009 | Lang |
| 2009/0217346 A1 | 8/2009 | Manring et al. |
| 2009/0241178 A1 | 9/2009 | Burch et al. |
| 2009/0254476 A1 | 10/2009 | Sharma et al. |
| 2009/0254975 A1 | 10/2009 | Turnbull et al. |
| 2010/0016001 A1 | 1/2010 | Yang |
| 2010/0036741 A1 | 2/2010 | Cleven |
| 2010/0039266 A1 | 2/2010 | Faris et al. |
| 2010/0048167 A1 | 2/2010 | Chow et al. |
| 2010/0064345 A1 | 3/2010 | Bentley et al. |
| 2010/0070376 A1 | 3/2010 | Proud et al. |
| 2010/0100897 A1 | 4/2010 | Manuel-Devadoss |
| 2010/0122333 A1 | 5/2010 | Noe |
| 2010/0241571 A1 | 9/2010 | McDonald |
| 2010/0257099 A1 | 10/2010 | Bonalle et al. |
| 2010/0268645 A1 | 10/2010 | Martino et al. |
| 2010/0299262 A1 | 11/2010 | Handler |
| 2010/0312636 A1 | 12/2010 | Coulter et al. |
| 2010/0330958 A1 | 12/2010 | Corda et al. |
| 2011/0004921 A1* | 1/2011 | Homer .................... G06F 21/31 726/3 |
| 2011/0007921 A1* | 1/2011 | Stewart, Jr. .......... H04R 1/2865 381/340 |
| 2011/0016534 A1 | 1/2011 | Jakobsson et al. |
| 2011/0022483 A1 | 1/2011 | Hammad |
| 2011/0047075 A1 | 2/2011 | Fourez |
| 2011/0099104 A1 | 4/2011 | Nybom |
| 2011/0103586 A1 | 5/2011 | Nobre et al. |
| 2011/0137804 A1 | 6/2011 | Peterson |
| 2011/0142234 A1 | 6/2011 | Rogers |
| 2011/0159846 A1 | 6/2011 | Kemshall |
| 2011/0166992 A1 | 7/2011 | Dessert |
| 2011/0167440 A1 | 7/2011 | Greenfield |
| 2011/0208601 A1 | 8/2011 | Ferguson et al. |
| 2011/0218907 A1 | 9/2011 | Dessert et al. |
| 2011/0251892 A1 | 10/2011 | Laracey |
| 2011/0252446 A1 | 10/2011 | Jeong et al. |
| 2011/0270618 A1 | 11/2011 | Banerjee et al. |
| 2011/0277016 A1 | 11/2011 | Hockings et al. |
| 2011/0294066 A1 | 12/2011 | Hasegawa |
| 2011/0320296 A1 | 12/2011 | Edwards |
| 2012/0018506 A1 | 1/2012 | Hammad et al. |
| 2012/0023567 A1 | 1/2012 | Hammad |
| 2012/0030047 A1 | 2/2012 | Fuentes et al. |
| 2012/0030109 A1 | 2/2012 | Dooley Maley et al. |
| 2012/0054057 A1 | 3/2012 | O'Connell et al. |
| 2012/0089514 A1 | 4/2012 | Kraemling et al. |
| 2012/0095916 A1 | 4/2012 | Dorsey et al. |
| 2012/0120880 A1 | 5/2012 | Lee et al. |
| 2012/0131828 A1 | 5/2012 | August et al. |
| 2012/0137340 A1 | 5/2012 | Jakobsson et al. |
| 2012/0144461 A1 | 6/2012 | Rathbun |
| 2012/0144468 A1 | 6/2012 | Pratt et al. |
| 2012/0158540 A1 | 6/2012 | Ganti et al. |
| 2012/0158586 A1 | 6/2012 | Ganti et al. |
| 2012/0160912 A1 | 6/2012 | Laracey |
| 2012/0166334 A1 | 6/2012 | Kimberg et al. |
| 2012/0171237 A1 | 7/2012 | Ching et al. |
| 2012/0173551 A1 | 7/2012 | Haddorp et al. |
| 2012/0174237 A1 | 7/2012 | Krzyzanowski |
| 2012/0179558 A1 | 7/2012 | Fischer |
| 2012/0197743 A1 | 8/2012 | Grigg et al. |
| 2012/0197794 A1 | 8/2012 | Grigg |
| 2012/0203700 A1 | 8/2012 | Ornce et al. |
| 2012/0209773 A1 | 8/2012 | Ranganathan |
| 2012/0230539 A1 | 9/2012 | Calman et al. |
| 2012/0239576 A1 | 9/2012 | Rose et al. |
| 2012/0252365 A1 | 10/2012 | Lam |
| 2012/0254941 A1 | 10/2012 | Levien et al. |
| 2012/0254943 A1 | 10/2012 | Li |
| 2012/0260318 A1 | 10/2012 | Fromentoux et al. |
| 2012/0265585 A1 | 10/2012 | Muirbrook et al. |
| 2012/0271712 A1 | 10/2012 | Katzin et al. |
| 2012/0290482 A1 | 11/2012 | Atef et al. |
| 2012/0293303 A1 | 11/2012 | Khan et al. |
| 2012/0300938 A1 | 11/2012 | Kean et al. |
| 2012/0316963 A1 | 12/2012 | Moshfeghi |
| 2012/0316992 A1 | 12/2012 | Oborne |
| 2012/0317034 A1 | 12/2012 | Guha et al. |
| 2012/0323783 A1 | 12/2012 | Canetto |
| 2012/0330846 A1 | 12/2012 | Light et al. |
| 2013/0007874 A1 | 1/2013 | Purvis |
| 2013/0009547 A1 | 1/2013 | Shiu et al. |
| 2013/0013498 A1 | 1/2013 | Fisher et al. |
| 2013/0013499 A1 | 1/2013 | Kalgi |
| 2013/0018738 A1 | 1/2013 | Faires et al. |
| 2013/0018791 A1 | 1/2013 | Mendicino et al. |
| 2013/0024360 A1 | 1/2013 | Ballout |
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0036000 A1 | 2/2013 | Giordano et al. |
| 2013/0036037 A1 | 2/2013 | Meredith et al. |
| 2013/0036048 A1 | 2/2013 | Campos et al. |
| 2013/0042314 A1 | 2/2013 | Kelley |
| 2013/0046692 A1 | 2/2013 | Grigg et al. |
| 2013/0054336 A1 | 2/2013 | Graylin |
| 2013/0054470 A1 | 2/2013 | Campos et al. |
| 2013/0060689 A1 | 3/2013 | Oskolkov et al. |
| 2013/0060708 A1 | 3/2013 | Oskolkov et al. |
| 2013/0085927 A1 | 4/2013 | Scott |
| 2013/0097682 A1 | 4/2013 | Zeljkovic et al. |
| 2013/0097683 A1 | 4/2013 | Davis et al. |
| 2013/0097684 A1 | 4/2013 | Kim |
| 2013/0102283 A1 | 4/2013 | Lau et al. |
| 2013/0110658 A1 | 5/2013 | Lyman et al. |
| 2013/0111208 A1 | 5/2013 | Sabin et al. |
| 2013/0124346 A1 | 5/2013 | Baldwin et al. |
| 2013/0132277 A1 | 5/2013 | Naqvi |

(56) References Cited

U.S. PATENT DOCUMENTS

| | | |
|---|---|---|
| 2013/0138627 A1 | 5/2013 | Zaydman et al. |
| 2013/0143621 A1 | 6/2013 | Kumaran |
| 2013/0159178 A1 | 6/2013 | Colon et al. |
| 2013/0160100 A1 | 6/2013 | Langley |
| 2013/0166332 A1 | 6/2013 | Hammad |
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0179341 A1 | 7/2013 | Boudreau |
| 2013/0179954 A1 | 7/2013 | Bidare |
| 2013/0188485 A1 | 7/2013 | Midani et al. |
| 2013/0191227 A1 | 7/2013 | Pasa et al. |
| 2013/0198056 A1 | 8/2013 | Aldrey et al. |
| 2013/0204775 A1 | 8/2013 | Midkiff et al. |
| 2013/0204787 A1 | 8/2013 | Dubois |
| 2013/0212007 A1 | 8/2013 | Mattsson |
| 2013/0212019 A1 | 8/2013 | Mattsson et al. |
| 2013/0219454 A1 | 8/2013 | Hewinson |
| 2013/0219473 A1 | 8/2013 | Schaefer |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0262315 A1 | 10/2013 | Hruska |
| 2013/0267204 A1 | 10/2013 | Schultz et al. |
| 2013/0268437 A1 | 10/2013 | Desai et al. |
| 2013/0290361 A1 | 10/2013 | Anderson et al. |
| 2013/0304637 A1 | 11/2013 | McCabe et al. |
| 2013/0304651 A1 | 11/2013 | Smith |
| 2013/0318627 A1 | 11/2013 | Lundkvist et al. |
| 2013/0332358 A1 | 12/2013 | Zhao |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |
| 2014/0058938 A1 | 2/2014 | McClung, III |
| 2014/0089376 A1 | 3/2014 | Caldas et al. |
| 2014/0096215 A1* | 4/2014 | Hessler ............... H04L 63/0869 726/7 |
| 2014/0109243 A1 | 4/2014 | Ting et al. |
| 2014/0122337 A1 | 5/2014 | Kang |
| 2014/0123244 A1 | 5/2014 | Resch et al. |
| 2014/0129357 A1 | 5/2014 | Goodwin |
| 2014/0130127 A1 | 5/2014 | Toole et al. |
| 2014/0143089 A1 | 5/2014 | Campos et al. |
| 2014/0143145 A1 | 5/2014 | Kortina |
| 2014/0143149 A1* | 5/2014 | Aissi ................... G06F 21/31 705/44 |
| 2014/0172707 A1 | 6/2014 | Kuntagod et al. |
| 2014/0173704 A1 | 6/2014 | Adams et al. |
| 2014/0187148 A1 | 7/2014 | Taite et al. |
| 2014/0188719 A1 | 7/2014 | Poornachandran et al. |
| 2014/0195425 A1 | 7/2014 | Campos et al. |
| 2014/0208401 A1 | 7/2014 | Balakrishnan et al. |
| 2014/0214640 A1 | 7/2014 | Mallikarjunan et al. |
| 2014/0244493 A1 | 8/2014 | Kenyon et al. |
| 2014/0244503 A1 | 8/2014 | Sadlier |
| 2014/0245391 A1 | 8/2014 | Adenuga |
| 2014/0245411 A1 | 8/2014 | Meng et al. |
| 2014/0250009 A1 | 9/2014 | Carlson |
| 2014/0273948 A1 | 9/2014 | Ramprasad |
| 2014/0279270 A1 | 9/2014 | Bertanzetti et al. |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2014/0315574 A1 | 10/2014 | Shakespeare et al. |
| 2014/0324690 A1 | 10/2014 | Allen et al. |
| 2014/0330721 A1 | 11/2014 | Wang |
| 2014/0337175 A1 | 11/2014 | Katzin et al. |
| 2014/0359709 A1 | 12/2014 | Nassar et al. |
| 2014/0372743 A1 | 12/2014 | Rogers et al. |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032627 A1 | 1/2015 | Dill et al. |
| 2015/0039601 A1 | 2/2015 | Harrang et al. |
| 2015/0073987 A1 | 3/2015 | Dutt |
| 2015/0081557 A1 | 3/2015 | Kinfoil et al. |
| 2015/0081567 A1 | 3/2015 | Boyle et al. |
| 2015/0100495 A1 | 4/2015 | Salama et al. |
| 2015/0100788 A1 | 4/2015 | Chastain et al. |
| 2015/0120569 A1 | 4/2015 | Belshe et al. |
| 2015/0120572 A1 | 4/2015 | Slade |
| 2015/0161610 A1 | 6/2015 | Sahadevan et al. |
| 2015/0170149 A1 | 6/2015 | Sharma et al. |
| 2015/0171049 A1 | 6/2015 | Wasserman et al. |
| 2015/0206131 A1 | 7/2015 | Phillips et al. |
| 2015/0206137 A1 | 7/2015 | Mazarim Fernandes |
| 2015/0206416 A1 | 7/2015 | Marra et al. |
| 2015/0213474 A1 | 7/2015 | Howe |
| 2015/0220914 A1 | 8/2015 | Purves et al. |
| 2015/0227903 A1 | 8/2015 | Votaw et al. |
| 2015/0227924 A1 | 8/2015 | Grigg et al. |
| 2015/0227926 A1 | 8/2015 | Grigg et al. |
| 2015/0229625 A1 | 8/2015 | Grigg et al. |
| 2015/0254648 A1 | 9/2015 | Clements et al. |
| 2015/0254653 A1 | 9/2015 | Bondesen et al. |
| 2015/0254664 A1 | 9/2015 | Bondesen et al. |
| 2017/0126639 A1 | 5/2017 | Jones-McFadden et al. |
| 2017/0199805 A1 | 7/2017 | Cotugno et al. |

OTHER PUBLICATIONS

Simon, "Credit-Card Reward Programs: A Short History"; Creditcards.com, Nov. 2006, 4 pages.

Lane, "History of APIs"; APIEvangelist.com; Dec. 2012, 11 pages.

U.S. Appl. No. 13/800,916, filed Mar. 13, 2013, Grigg, David M. et al.

U.S. Appl. No. 13/829,551, filed Mar. 14, 2013, Sep. 18, 2014, Bertanzetti, Peter John et al.

U.S. Appl. No. 14/175,639, filed Feb. 7, 2014, Aug. 13, 2015, Grigg, David M. et al.

U.S. Appl. No. 14/175,646, filed Feb. 7, 2014, Aug. 13, 2015, Grigg, David M. et al.

U.S. Appl. No. 14/175,701, filed Feb. 7, 2014, Aug. 13, 2015, Grigg, David M. et al.

U.S. Appl. No. 14/175,947, filed Feb. 7, 2014, Aug. 13, 2015, Grigg, David M. et al.

U.S. Appl, No. 14/175,954, filed Feb. 7, 2014, Aug. 13, 2015, Grigg, David M. et al.

U.S. Appl. No. 14/175,863, filed Feb. 7, 2014, Aug. 13, 2015, Grigg, David M. et al.

U.S. Appl. No. 14/175,615, filed Feb. 7, 2014, Aug. 13, 2015, Grigg, David M. et al.

U.S. Appl. No. 14/175,688, filed Feb. 7, 2014, Aug. 13, 2015, Grigg, David M. et al.

U.S. Appl. No. 14/175,672. filed Feb. 7, 2014, Aug. 13, 2015, Grigg, David M. et al.

U.S. Appl. No. 14/175,136, filed Feb. 7, 2014, Aug. 13, 2015, Grigg, David M. et al.

U.S. Appl. No. 14/175,146, filed Feb. 7, 2014, Aug. 13, 2015, Grigg, David M. et al.

U.S. Appl. No. 14/175,652, filed Feb. 7, 2014, Aug. 13, 2015, Grigg, David M. et al.

U.S. Appl. No. 14/175,956, filed Feb. 7, 2014, Aug. 13, 2015, Grigg, David M. et al.

U.S. Appl. No. 14/175,962, filed Feb. 7, 2014, Aug. 13, 2015, Grigg, David M. et al.

U.S Appl. No. 14/175,771, filed Feb. 7, 2014, Aug. 13, 2015, Votaw, Elizabeth S. et al.

U.S. Appl. No. 14/175,786, filed Feb. 7, 2014, Aug. 13, 2015, Votaw, Elizabeth S. et al.

U.S. Appl. No. 14/175,643, filed Feb. 7, 2014, Aug. 13, 2015, Grigg, David M. et al.

(56) References Cited

OTHER PUBLICATIONS

U.S. Patent & Trademark Office. U.S. Final Office Action dated Aug. 27, 2015. U.S. Appl. No. 14/175,701. Name of Applicant: Bank of America Corporation. English Language. 21 pages.

Tode, Chantal. "Walmart speeds up checkout, lets shoppers scan items via iPhone." Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

RISNews.edgl.com. "Supermarket Retailer Rolls Out Self-Checkout Smartphone App." http://risnews.edgl.com/retail-news/Supermarket-Retailer-Rolls-Out-Self-Checkout-Smartphone-App81027 2 pages. Retrieved Mar. 9, 2013.

QThru.com. "QThru: use your mobile smartphone for self-checkout." http://qthru.com/. QThru.com© 2011. 6 pages. Retrieved Mar. 22, 2013.

Zimmerman, Ann. "Check Out the Future of Shopping: Shaving Time Off the Weekly Grocery Run to Keep Consumers in Stores and Spending." http://online.wsj.com/article/SB10001424052748703421204576329253050637400.html. 5 pages. Retrieved Mar. 22, 2013.

\* cited by examiner

DETERMINING USER AUTHENTICATION REQUIREMENTS BASED ON THE CURRENT LOCATION OF THE USER IN COMPARISON TO THE USERS'S NORMAL BOUNDARY OF LOCATION

CLAIM OF PRIORITY UNDER 35 U.S.C. §120

The present invention is a Continuation of co-pending U.S. patent application Ser. No. 14/175,643, entitled, "Determining User Authentication Requirements Based on the Current Location of the User in Comparison to User's Normal Boundary of Location", filed on Feb. 7, 2014, the entire contents of which is hereby incorporated by reference and from which priority is claimed under 35 U.S.C. §120.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 6015US1.014033.2098 | 14/175,639 | DETERMINING USER AUTHENTICATION REQUIREMENTS BASED ON THE CURRENT LOCATION OF THE USER IN COMPARISON TO A USERS'S TRAVEL ROUTE | Feb. 7, 2014 |
| 6015US3.014033.2100 | 14/175,646 | DETERMINING USER AUTHENTICATION REQUIREMENTS BASED ON THE CURRENT LOCATION OF THE USER BEING WITHIN A PREDETERMINED AREA REQUIRING ALTERED AUTHENTICATION REQUIREMENTS | Feb. 7, 2014 |
| 6016US1.014033.2101 | 14/175,701 | USER AUTHENTICATION BASED ON HISTORICAL TRANSACTION DATA | Feb. 7, 2014 |
| 6017US1.014033.2102 | 14/175,947 | USER AUTHENTICATION BASED ON HISTORICAL USER BEHAVIOR | Feb. 7, 2014 |
| 6018US1.014033.2103 | 14/175,954 | USER AUTHENTICATION BY GEO-LOCATION AND PROXIMITY TO USER'S CLOSE NETWORK | Feb. 7, 2014 |
| 6019US1.014033.2106 | 14/175,863 | USER AUTHENTICATION BASED ON OTHER APPLICATIONS | Feb. 7, 2014 |
| 6020US1.014033.2107 | 14/175,615 | USER AUTHENTICATION BASED ON FOB/INDICIA SCAN | Feb. 7, 2014 |
| 6021US1.014033.2108 | 14/175,688 | USER AUTHENTICATION BASED ON SELF-SELECTED PREFERENCES | Feb. 7, 2014 |
| 6021US2.014033.2155 | 14/175,672 | SELF-SELECTED USER ACCESS BASED ON SPECIFIC AUTHENTICATION TYPES | Feb. 7, 2014 |
| 6022US1.014033.2109 | 14/175,136 | SHUTTING DOWN ACCESS TO ALL USER ACCOUNTS | Feb. 7, 2014 |
| 6023US1.014033.2110 | 14/175,146 | PROVIDING AUTHENTICATION USING PREVIOUSLY-VALIDATED AUTHENTICATION CREDENTIALS | Feb. 7, 2014 |
| 6024US1.014033.2111 | 14/175,652 | DETERMINING AUTHENTICATION REQUIREMENTS ALONG A CONTINUUM BASED ON A CURRENT STATE OF THE USER AND/OR THE SERVICE REQUIRING AUTHENTICATION | Feb. 7, 2014 |
| 6025US1.014033.2126 | 14/175,956 | SORTING MOBILE BANKING FUNCTIONS INTO AUTHENTICATION BUCKETS | Feb. 7, 2014 |
| 6025US2.014033.2127 | 14/175,962 | AUTHENTICATION LEVEL OF FUNCTION BUCKET BASED ON CIRCUMSTANCES | Feb. 7, 2014 |
| 6034US1.014033.2115 | 14/175,771 | REMOTE REVOCATION OF APPLICATION ACCESS BASED ON LOST OR MISAPPROPRIATED CARD | Feb. 7, 2014 |
| 6034US2.014033.2116 | 14/175,786 | REVOCATION OF APPLICATION ACCESS BASED ON NON-CO-LOCATED | Feb. 7, 2014 |

FIELD

In general, embodiments of the invention relate to user authentication and, more particularly, to determining a user's authentication requirements/credentials for a specific network access session based on the current location of the user in comparison to a user's normal boundary of location.

BACKGROUND

User authentication is typically required when a user conducts a transaction using a debit/credit card or seeks access to network-based services that store or have access to information that is personnel and/or warrants protection from unauthorized access by others (e.g., an online or mobile banking service or the like). User authentication serves to validate that the individual conducting the transaction is the individual authorized to use the debit/credit card account or that the individual seeking access to the network-based service is the individual authorized to access the service. Typically, a user provides authentication credentials, otherwise referred to herein as authentication requirements, (e.g., a user ID and password), which are then compared to the user's securely stored authentication credentials and, if the authentication credentials provided by the user match the stored authentication credentials, the user is allowed to conduct the transaction or gain access to the network-based service.

In many instances, a burden is placed on the user providing the authentication requirements. Specifically, the user must remember their authentication credential or, in the event that the user forgets the authentication credentials undertake a procedure to recover the authentication credentials. Remembering the authentication credentials can become problematic if the user does not use the network service and/or conduct such transactions frequently or if the user is required to change their authentication credentials periodically in order to insure their security. In addition to problems associated with remembering authentication credentials, the mere process of entering such authentication credentials either at a point-of-sale (POS) location or at a gateway to network service entry can be a burdensome and risky endeavor. In some instances, entry of such authentication credentials can be an inefficient and time-consuming process. For example, if the user is implementing a handheld mobile device, such as smart cellular telephone or the like, to gain access to a network-based service, entry of the authentication credentials on the device requires the ability of the user to see the display and accurately enter the credentials via the downsized keypad. If the authentication credentials require different case lettering and/or non-alphanumeric characters for security purposes entry becomes even more daunting and prone to entry errors. Moreover, if the user repeatedly enters the authentication incorrectly, the network-service may see this as a security risk and bar the user from further attempts, thereby denying the user entry to the network-service.

In addition to user inefficiency problems, entering authentication credentials in a public setting, such as a POS location or via a mobile device, presents risks that the authentication credentials may be nefariously intercepted by someone in the vicinity.

In today's computing networking environments, especially in the mobile or wireless realm, the entity that provides the network service or the authenticating entity may have instantaneous availability to other information, besides the user-provided authentication credentials, which can serve to at least assist in validating the identity of the user.

Therefore, a need exists to develop other methods, apparatus and computer program products for user authentication. The desired methods, apparatus and computer program products for user authentication should alleviate problems associated with inefficiencies in the current user authentication process and/or add additional security to the user authentication process. Further, the desired methods, apparatus and computer program products should leverage other information that the authenticating entity knows about the user at the time of the authentication request to assist in the authentication process. In this regard, the other information known about the user may serve to adjust the authentication requirements/credentials that the user must provide to gain access or, in some instances, eliminate the need for the user to provide authentication requirements/credentials.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by determining a user's authentication requirements/credentials for a specific network access session based on the current location of the user in comparison to known boundaries of location associated with the user, such as a pattern of movement (i.e., travel route) or the like. As such, the present invention serves to expedite the process for authenticating a user who desires to gain access to a network service, such as a banking application or the like. In this regard, if the user is determined to be within specified boundaries of a designated location associated with the user, minimal authentication requirements or, in some embodiments, no authentication requirements may be required. If the user is determined to be outside of the specified boundaries of a designated location by only a minimal distance (i.e., a slight deviation from the designated location), the user may be required to provide more in terms of authentication requirements/credentials (e.g., partial/soft authentication as opposed to full authentication). The specified boundary of a designated location may be highly specific, such as located within the user's office at a place of business, such that location outside the office while still located at the place of business (e.g., located within a conference room) may be deemed to be outside of the boundaries of the location and, as such, require more that minimal authentication credentials (e.g., partial/soft authentication). As such, the boundaries of the designated location may define authentication zones in which the degree of authentication required varies depending on which zone the user currently is located in.

Other known factors attributes associated with the user that define the current state of the user may also be implemented, in addition to the user's current location, in determining required authentication credentials needed to access the network service. In this regard, an authentication continuum may be provided in which the required authentication credentials are determined subjectively based on taking into account all of the known user attributes that define the user's current state, including but not limited to the user's current location.

An apparatus for determining user authentication requirements defines first embodiments of the invention. The apparatus includes a computing platform including a memory and a processor in communication with the memory. The apparatus further includes an authentication requirements module that is stored in the memory and executable by the processor. The authentication requirements module is configured to receive a request for a user to access a service requiring authentication and, in response to receiving the request, determine (1) a current physical location of the user and a current time, and (2) that the user is associated with a predetermined pattern of movement. The predetermined pattern of movement includes location boundaries and a time period. The authentication requirements module is further configured to determine proximity in distance and time of the current physical location of the user and current time to the predetermined pattern of movement associated with the user. Further, the authentication requirements module is configured to determine authentication requirements for the user to access the service based on the proximity in distance and time of the current physical location of the user and the current time to the predetermined pattern of movement. In response the determining the authentication requirements, the user is requested to provide the determined authentication requirements and is provided access to the service in response to the user providing the determined authentication requirements/credentials.

In specific embodiments of the apparatus, the authentication requirements module is further configured to determine a level of authentication required for the user to access the service based on the proximity in distance and time of the current physical location of the user to the predetermined pattern of movement, wherein the level of authentication is from amongst a plurality of levels of authentication. In such embodiments of the apparatus, each level of authentication is defined by at least one of a predetermined distance threshold or a predetermined time threshold. In one such embodiment of the apparatus the authentication requirements module is further configured to determine the level of authentication as a "no authentication required" level (i.e., no authentication required for the user to access the network service) based on the user currently being physically located within predetermined boundaries of the pattern of movement and the current time being within a predetermined time period for the user to be located within the pattern of movement. In another specific embodiment of the apparatus, the authentication requirements module is further configured to determine the level of authentication as a partial authentication level (i.e., less than full authentication requirements/credentials required to access the network service) based on one of either (a) the user currently being physically located within predetermined boundaries of the pattern of movement, or (b) the user currently being physically located outside of the pattern of movement by a predetermined distance (i.e., minimal deviation) and the current time being within a predetermined time period for the user to be located within the pattern of movement, wherein the partial authentication requires the user to provide less than full authentication credentials to access the service. In a still further specific embodiment of the apparatus, the authentication requirements module is further configured to determine the level of authentication as a full authentication level (i.e., standard or the highest authentication requirements to access the network service) based on one of (1) the user currently being physically located outside of the pattern of movement by a predetermined distance (i.e., significant deviation), or (2) the current time being outside of a predetermined time period for the user to be located within the pattern of movement.

In still further embodiments of the apparatus, the authentication requirements module is further configured to determine a point along an authentication continuum based on the proximity in distance and time of the current physical location of the user and the current time to the predetermined pattern of movement, wherein the point along the authentication continuum is used, at least in part, to determine the authentication requirements. In such embodiments, the authentication requirements may be subjectively determined based on other factors in addition to the current location of the user.

In still further embodiments the apparatus includes a service access module that is stored in the memory and executable by the processor. The service access module is configured to determine a level of access available to the user of the service upon the user providing the determined authentication requirements. The level of access defines functionality available to the user within the service based on the determined authentication requirements and the level of access is granted to the user in response to the user providing the determined authentication requirements.

A method for determining user authentication requirements defines second embodiment of the invention. The method includes receiving a request for a user to access a service requiring authentication and, in response to receiving the request, determining (1) a current physical location of the user and a current time and (2) that the user is associated with a predetermined pattern of movement. The predetermined pattern of movement includes location boundaries and a time period. The method further includes determining proximity in distance and time of the current physical location of the user and current time to the predetermined pattern of movement. In addition, the method includes determining authentication requirements for the user to access the service based on the proximity in distance and time of the current physical location of the user and the current time to the predetermined pattern of movement. In response the determining the authentication requirements, the user is requested to provide the determined authentication requirements and is provided access to the service in response to the user providing the determined authentication requirements/credentials.

In specific embodiments of the method, determining the authentication requirements further includes determining a level of authentication required for the user to access the service based on the proximity in distance and time of the current physical location of the user and the current time to the predetermined pattern of movement. In such embodiments, each level of authentication is defined by at least one of a predetermined distance threshold or a predetermined time threshold. Specific examples of levels of authentication include, but are not limited to, a no-authentication-required level, a partial authentication level and a full authentication level. The no-authentication-required level (i.e., no authentication required for the user to access the network service) may be based on the user currently being physically located within the predetermined boundaries of the pattern of movement and the current time being within the time period for the user to be located within the pattern of movement. The partial authentication level (i.e., less than full authentication requirements/credentials required to access the network service) may be based on one of either (a) the user currently being physically located within predetermined boundaries of the pattern of movement or (b) the user currently being physically located outside of the pattern of movement by a predetermined distance (i.e., minimal deviation) and the current time being within a predetermined time period for the user to be located within the pattern of movement. The full authentication level may be based on one of (1) the user currently being physically located outside of the pattern of movement by a predetermined distance (i.e., significant deviation), or (2) the current time being outside of a predetermined time period for the user to be located within the pattern of movement.

In other specific embodiments of the method, determining the authentication requirements further includes determining a point along an authentication continuum based on the proximity in distance and time of the current physical location of the user and the current time to the predetermined pattern of movement. The point along the authentication continuum is used, at least in part, to determine the authentication requirements. In such embodiments, the authentication requirements may be subjectively determined based on other factors in addition to the current location of the user.

In still further embodiments the method includes determining a level of access available to the user of the service upon the user providing the determined authentication requirements. The level of access defines functionality available to the user within the service based on the determined authentication requirements, wherein the level of access is granted to the user in response to the user providing the determined authentication requirements.

A computer program product including a non-transitory computer-readable medium defines third embodiments of the invention. The computer-readable medium includes a first set of codes for causing a computer to receive a request for a user to access a service requiring authentication and a second set of codes for causing a computer to, in response to receiving the request, determine (1) a current physical location of the user and a current time and (2) that the user is associated with a predetermined pattern of movement. The computer-readable medium additionally includes a third set of codes for causing a computer to determine proximity in distance and time of the current physical location of the user and current time to a predetermined pattern of movement and a fourth set of codes for causing a computer to determine authentication requirements for the user to access the service based on the proximity in distance and time of the current physical location of the user and the current time to the predetermined pattern of movement. In response the determining the authentication requirements, the user is requested to provide the determined authentication requirements and is provided access to the service in response to the user providing the determined authentication requirements/credentials.

Thus, systems, apparatus, methods, and computer program products herein described in detail below for determining a user's authentication requirements/credentials for a specific network access session based on the current location of the user in comparison to known boundaries of location (i.e., patterns of movement) associated with the user, such as a travel route or the like. As such, the present invention serves to expedite the process for authenticating a user who desires to gain access to a network service, such as a banking application or the like.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
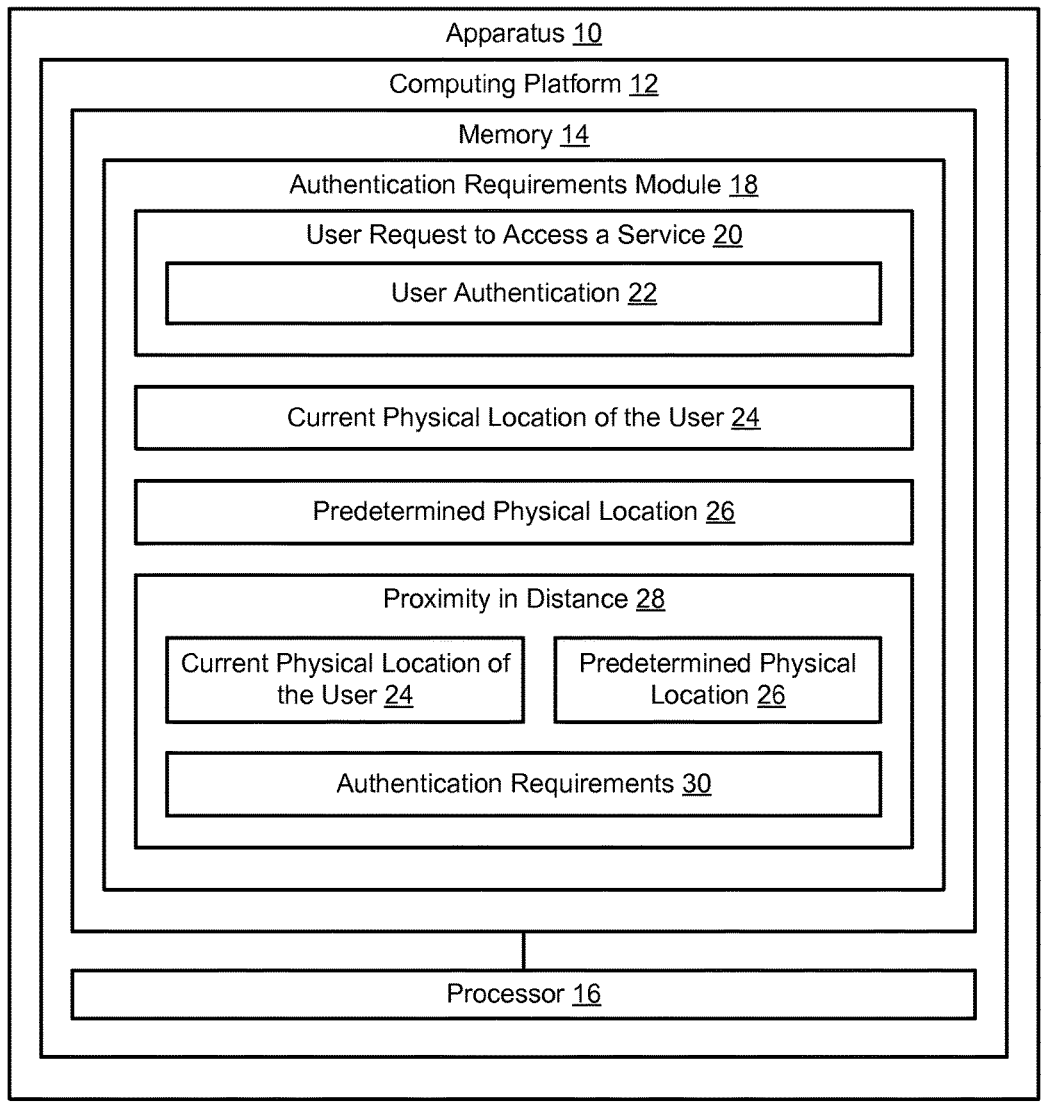
Figure 2:
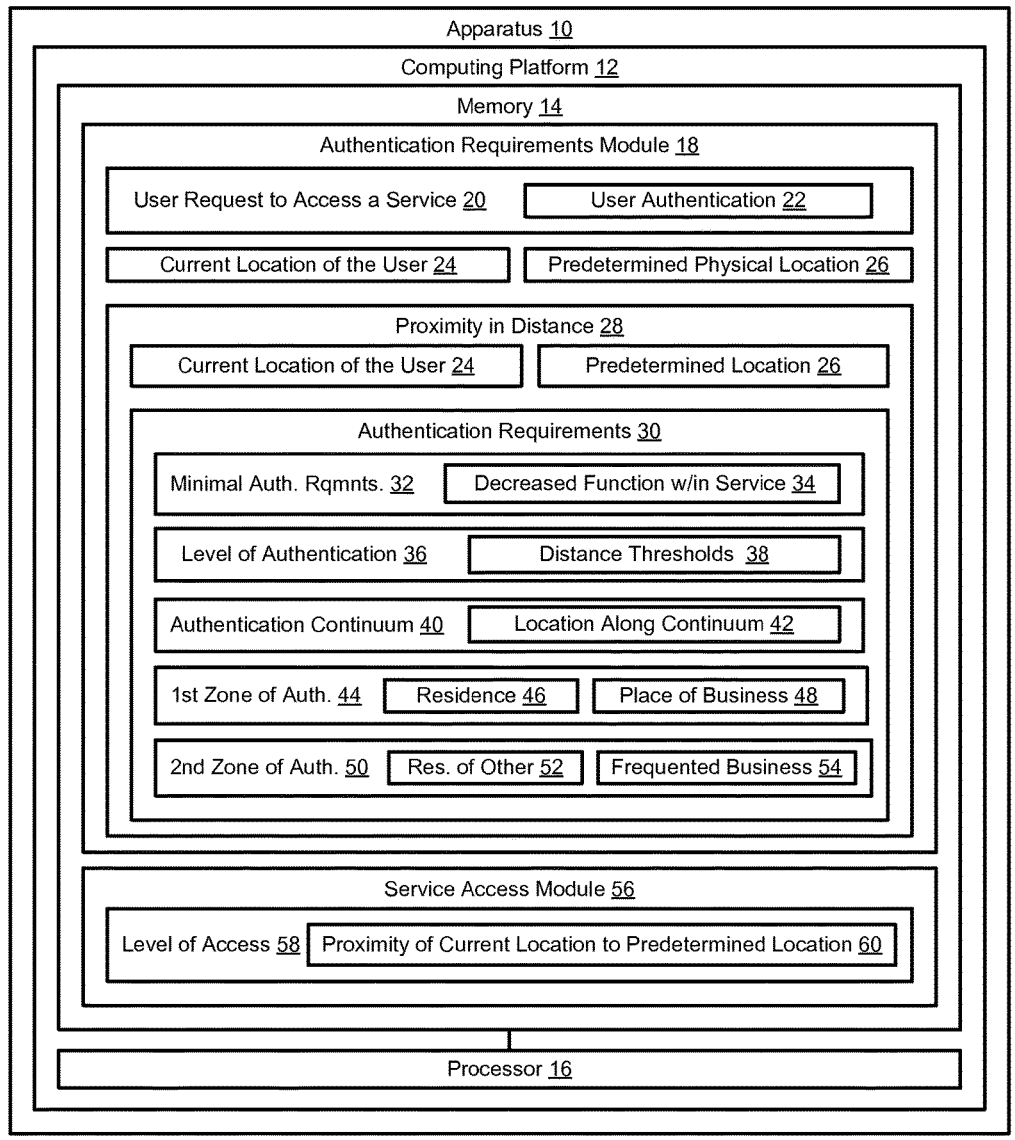
Figure 3:
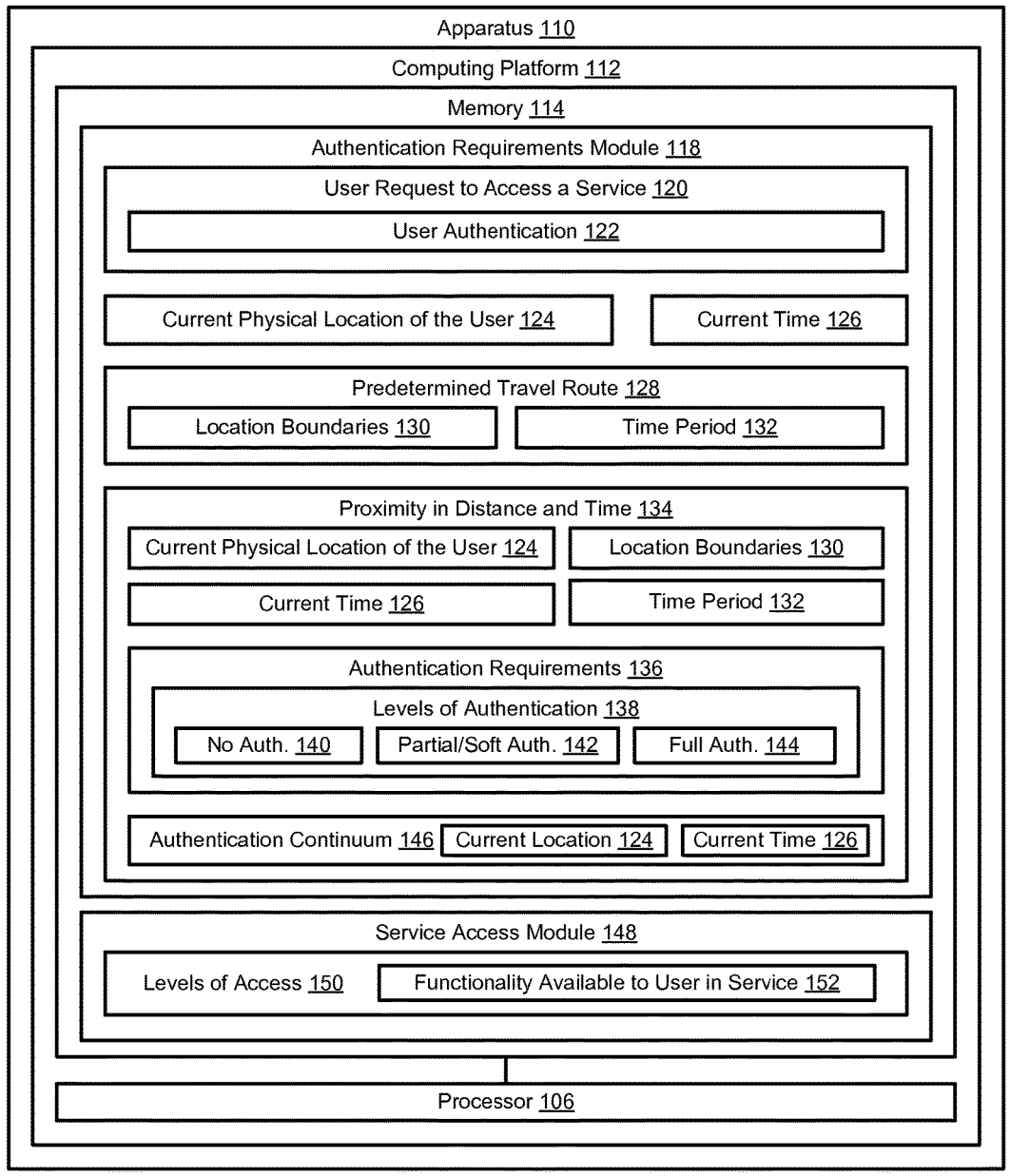
Figure 4:
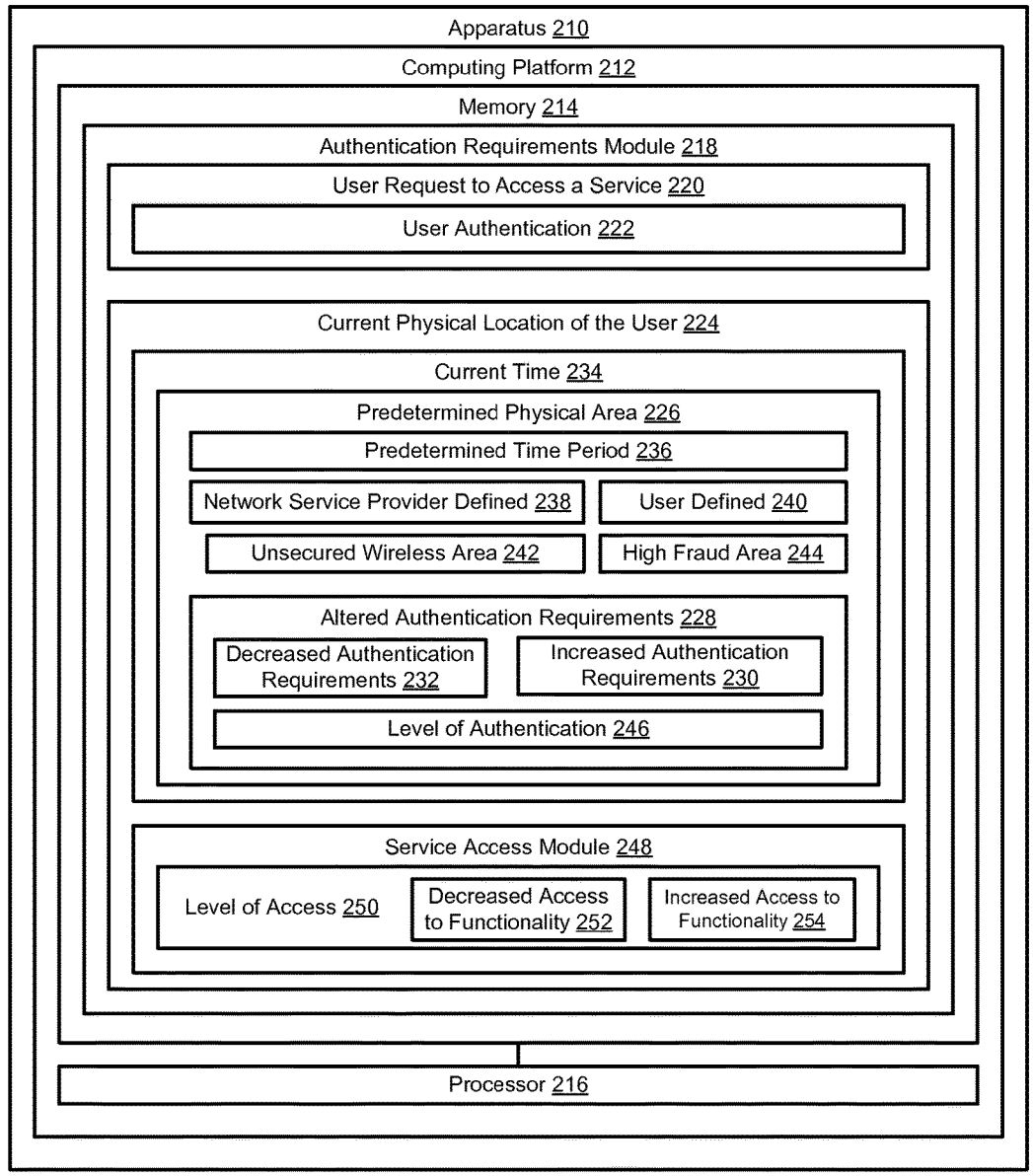
Figure 5:
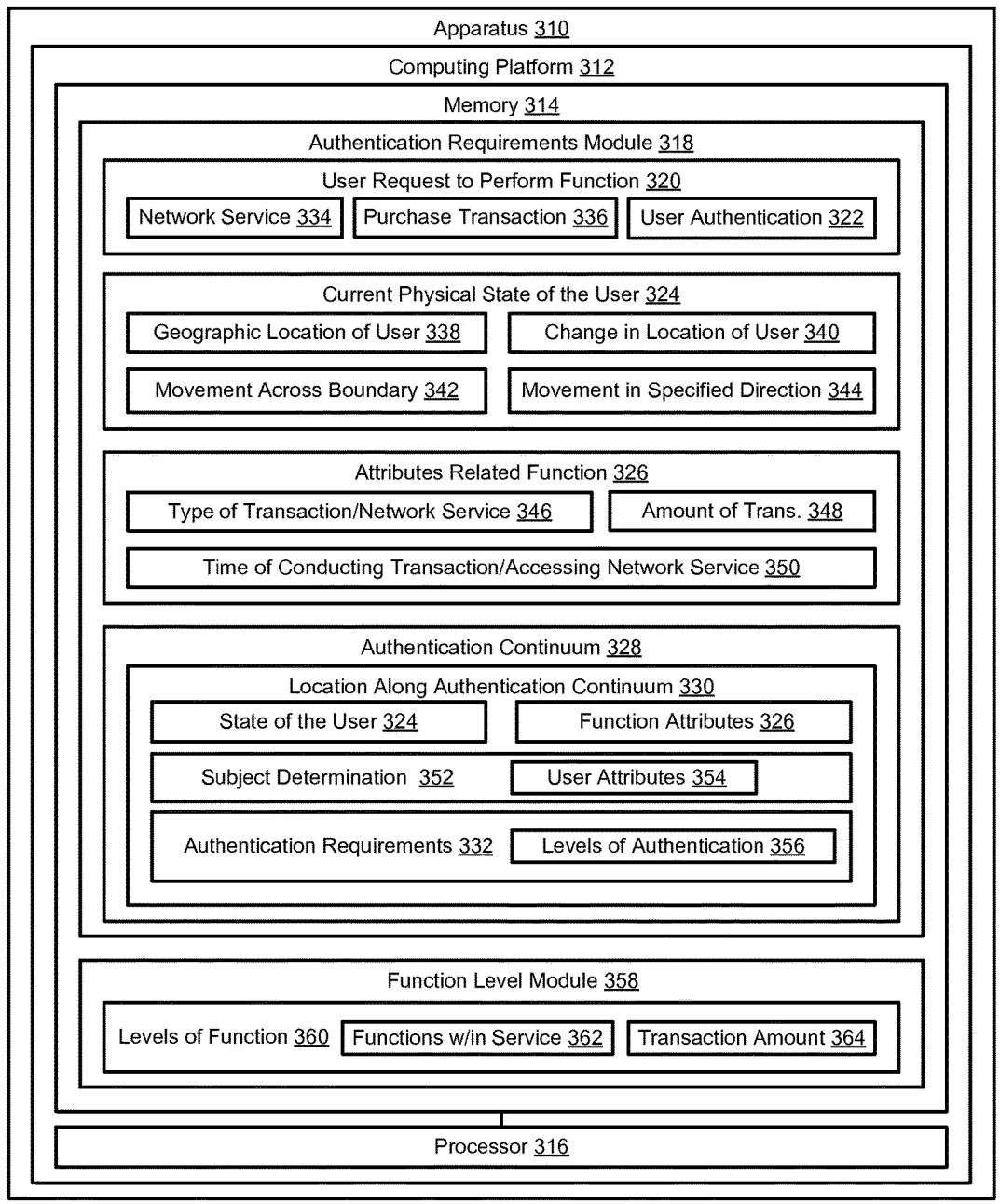
Figure 6:
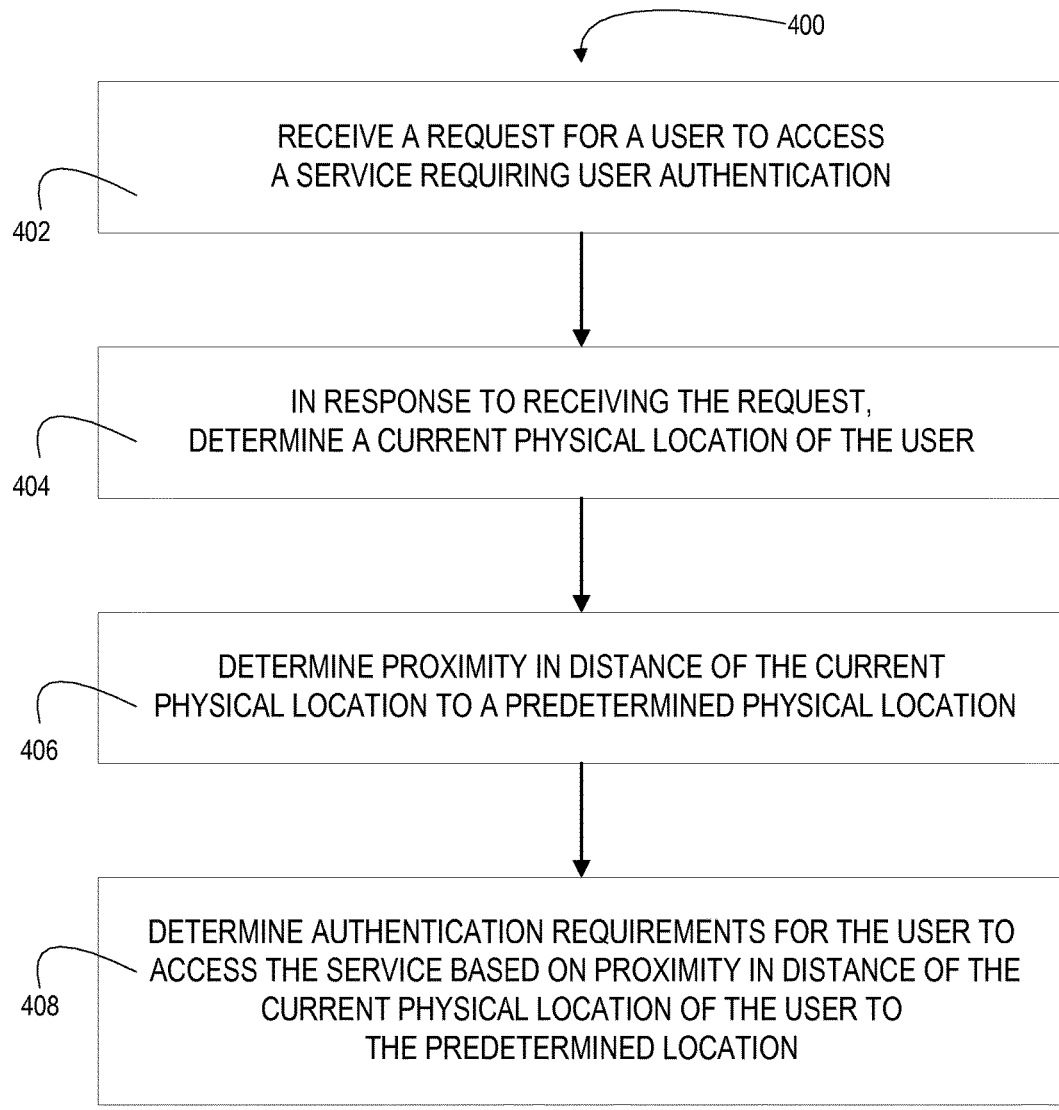

Having thus described embodiments of the invention in general terms, reference will now be made to the accompanying drawings, which are not necessarily drawn to scale, and wherein:

FIG. 1 provides a block diagram of an apparatus configured for determining a user's authentication requirements/credentials for a specific network access session based on the current location of the user in comparison to a user's normal boundary of location, in accordance with embodiments of the present invention;

FIG. 2 provides a more detailed block diagram of an apparatus configured for determining a user's authentication requirements/credentials for a specific network access session based on the current location of the user in comparison to a user's normal boundary of location, in accordance with present embodiments of the invention;

FIG. 3 provides a detailed block diagram of an alternate embodiment of apparatus configured for determining a user's authentication requirements for a network-based service based on proximity in distance and time to a predetermined pattern of movement, in accordance with present embodiments of the invention;

FIG. 4 provides a detailed block diagram of an alternate embodiment of apparatus configured for determining user authentication requirements/credentials for a specific mobile network access session based on the current location of the user being within a predefined area requiring altered (i.e., increased or decreased) authentication requirements, in accordance with present embodiments of the invention;

FIG. 5 provides a detailed block diagram of an alternate embodiment of apparatus configured for determining a user's authentication requirements/credentials for a specific service along an authentication continuum based on a current state of the user and/or service attributes; and FIG. 6 provides a flow diagram of a method for determining a user's authentication requirements/credentials for a specific network access session based on the current location of the user in comparison to a user's normal boundary of location, in accordance with present embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

In those embodiments in which the apparatus comprises or is in communication with a mobile communication device, the user of the mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device identification information. Typically, the device identification information (e.g., a serial number, an identification code, an International Mobile Station Equipment Identity (IMEI), a phone number, a chip, a removable part, or similar pieces of device identification information) is collected from the mobile device without requiring user input. For example, the device identification information may be automatically provided by the mobile device. Alternatively, the mobile device may provide the information without requiring user input after receiving a request from a system for the identification information. In other embodiments, device identification information may be entered manually at the mobile device. For example, if the mobile device's serial number cannot be automatically located (perhaps due to interference, long range, or similar hindrance), the user may be prompted for manual entry of the serial number (or an identification code, an International Mobile Station Equipment Identity (IMEI), a phone number, a chip, a removable part, or similar pieces of device identification information). The device identification information may be stored and subsequently used to identify the user of the mobile device.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for determining a user's authentication requirements/credentials for a specific network access session based on the current location of the user in comparison to known boundaries of location associated with the user, such as the user's residence, place of business or the like. As such, the present invention serves to expedite the process for authenticating a user who desires to gain access to a network service, such as a banking application or the like. In this regard, if the user is determined to be within specified boundaries of a designated location associated with the user, minimal authentication requirements or, in some embodiments, no authentication requirements may be required. If the user is determined to be outside of the specified boundaries of a designated location by only a minimal distance (i.e., a slight deviation from the designated location), the user may be required to provide more in terms of authentication requirements/credentials (e.g., partial/soft authentication as opposed to full authentication). The specified boundary of a designated location may be highly specific, such as located within the user's office at a place of business, such that location outside the office while still located at the place of business (e.g., located within a conference room) may be deemed to be outside of the boundaries of the location and, as such, require more that minimal authentication credentials (e.g., partial/soft authentication). As such, the boundaries of the designated location may define authentication zones in which the degree of authentication required varies depending on which zone the user currently is located in.

Other known factors attributes associated with the user that define the current state of the user may also be implemented, in addition to the user's current location, in determining required authentication credentials needed to access the network service. In this regard, an authentication continuum may be provided in which the required authentication credentials are determined subjectively based on taking into account all of the known user attributes that define the user's current state, including but not limited to the user's current location.

Referring to FIG. 1, a block diagram is presented of an apparatus 10 configured determining a user's authentication requirements/credentials for a specific network access session based on the current location of the user in comparison to a user's normal boundary of location, in accordance with embodiments of the present invention. The apparatus 10 includes a computing platform 12 having a memory 14 and at least one processor 16 in communication with the memory 14. The memory 14 of apparatus 10 stores authentication requirements module 18. The authentication requirements module 18 is configured to determine the authentication requirements/credentials that a user is required to provide to access a network service that the user desires to access via a mobile communication device. A specific example a network service may include, but is not limited to, a mobile banking network service or the like. As such, the authentication requirements module 18 is configured to receive a request 20 from a mobile communication device for a user to access a network-based service that requires user authentication 22. The user authentication may be required to gain access to the network-service and/or to conduct a transaction on the network-service.

In response to receiving the request, the module 18 is configured to determine the current physical (i.e., geographic) location 24 of the user. The user is known to the module 18 since the service request is coming from a mobile communication device that is identifiable by procedures discussed previously. The current physical location 24 of the user may be determined by a location-determining mechanism (e.g., Global Positioning System (GPS) device or the like) in the mobile communication device or via wireless signals transmitted from the mobile device using triangulation methodology or the like.

Once the authentication requirements module 18 has the current physical location of the user 24, the module 18 is further configured to determine the proximity in distance 28 of the current physical location of the user 24 to a predetermined physical location 26. The module 18 may access a user profile to determine that the user is associated with one or more predetermined physical locations 26. The predetermined physical locations 26 are geographic areas in which the user is frequently located, for example the user's place of residence, the user's place of business or the like. Predetermined physical locations 26 may be predetermined based on user inputs that identify the location. In such embodiments a user who is travelling may designate specific physical location (e.g., a temporary residence or place of business) for a specific period of time (i.e., the travel period) and, as such, the predetermined physical locations may be temporal, in nature. In other embodiments of the invention, the predetermined physical locations may be determined intuitively in an automated fashion based on monitoring, over time, the location of the user in relation to their mobile device. In such embodiments, the user may notified (via an alert or the like) of such locations for the purpose of confirming the location as one in which less authentication requirements may be required to access a service.

The authentication requirements module 18 is further configured to determine the authentication requirements 30 (i.e., the authentication credentials required by the user) for the user to currently access the service based on the proximity in distance 28 of the current physical location of the user 24 to the predetermined physical location 26. In specific embodiments of the invention, if the user is determined to be within the location boundaries of the predetermined physical location 26, the authentication requirements 36 may be that no authentication is required by the user to access the service or partial authentication (i.e., soft authentication) is required. Partial authentication is defined as some form of authentication credentials less than full credentials. For example, if full credentials (i.e., standard credentials normally required to access the service) comprise a user ID, passcode and identification of a predetermined site key, partial credentials may be limited to user ID or the passcode or a less complex passcode, e.g., a four digit Personal Identification Number (PIN) or the like. If the user is determined to only slightly deviate from the predetermined physical location 26, the authentication requirements 36 may be partial authentication (i.e., soft authentication). However, in the instance in which partial authentication is required when the user is determined to be within the predetermined physical location 26 boundaries, the partial authentication that is required when the user has been determined to slightly deviate in proximity to the predetermined physical location may be different and more extensive than the partial authentication required when the user is determined to be within the boundaries predetermined physical location 26 (i.e., partial/soft authentication may be on a sliding scale basis in which the amount/degree of authentication requirements/credentials increases the further in distance the user deviates from the boundaries of the predetermined physical location. Moreover, if the user is determined to be a predetermined distance (i.e., significant deviation) outside of the boundaries of the predetermined physical location, full authentication requirements/credentials may be required for the user to access the service.

Referring to FIG. 2, a block diagram is presented of an apparatus 10 configured to determining a user's authentication requirements/credentials for a specific network access session based on the current location of the user in comparison to a user's normal boundary of location, in accordance with embodiments of the present invention. The apparatus 10 may include any type and/or combination of one or more computing devices. The apparatus 10 is operable to receive and execute modules, routines and applications, such as authentication requirements module 18 and the like.

The apparatus 10 includes computing platform 12 that can receive and execute routines and applications. Computing platform 12 includes memory 14, which may comprise volatile and nonvolatile memory such as read-only and/or random-access memory (RAM and ROM), EPROM, EEPROM, flash cards, or any memory common to computer platforms. Further, memory 14 may include one or more flash memory cells, or may be any secondary or tertiary storage device, such as magnetic media, optical media, tape, or soft or hard disk.

Further, computing platform 12 also includes at least one processor 16, which may be an application-specific integrated circuit ("ASIC"), or other chipset, processor, logic circuit, or other data processing device. Processor 16 or other processor such as ASIC may execute an application programming interface ("API") layer (not shown in FIG. 2) that interfaces with any resident programs, such as authentication requirements module 18 or the like, stored in the memory 14 of apparatus 10. Processor 16 includes various processing subsystems (not shown in FIG. 2) embodied in hardware, firmware, software, and combinations thereof, that enable the functionality of apparatus 10 and the operability of the apparatus on a network. For example, processing subsystems allow for initiating and maintaining communications, and exchanging data, with other networked devices. Additionally, processing subsystems may include any portion of the functionality of authentication requirements module 18 obviating the need for such applications and modules to be stored in the memory.

As previously noted in relation to FIG. 1, memory 14 stores authentication requirements module 18 that is configured to determining a user's authentication requirements/credentials for a specific network access session based on the current location of the user in comparison to a user's normal boundary of location. The authentication requirements module 18 is configured to receive a request 20 from a mobile communication device for a user to access a network-based service that requires user authentication 22. The user authentication may be required to gain access to the network-service and/or to conduct a transaction on the network-service.

In response to receiving the request, the module 18 is configured to determine the current physical (i.e., geographic) location 24 of the user. The user is known to the module 18 since the service request is coming from a mobile communication device that is identifiable by procedures discussed previously. The current physical location 24 of the user may be determined by a location-determining mechanism (e.g., Global Positioning System (GPS) device or the like) in the mobile communication device or via wireless signals transmitted from the mobile device using triangulation methodology or the like.

Once the authentication requirements module 18 has the current physical location of the user 24, the module 18 is further configured to determine the proximity in distance 28 of the current physical location of the user 24 to a predetermined physical location 26. The module 18 may access a user profile to determine that the user is associated with one or more predetermined physical locations 26. The predetermined physical locations 26 are geographic areas in which the user is frequently located, for example the user's place of residence, the user's place of business or the like. Predetermined physical locations 26 may be predetermined based on user inputs that identify the location. In such embodiments a user who is travelling may designate specific physical location (e.g., a temporary residence or place of business) for a specific period of time (i.e., the travel period) and, as such, the predetermined physical locations may be temporal, in nature. In other embodiments of the invention, the predetermined physical locations may be determined intuitively in an automated fashion based on monitoring, over time, the location of the user in relation to their mobile device. In such embodiments, the user may notified (via an alert or the like) of such locations for the purpose of confirming the location as one in which less authentication requirements may be required to access a service.

The authentication requirements module 18 is further configured to determine the authentication requirements 30 (i.e., the authentication credentials required by the user) for the user to currently access the service based on the proximity in distance 28 of the current physical location of the user 24 to the predetermined physical location 26.

In specific embodiments of the invention, the authentication requirements module 18 to determine the minimal authentication requirements 32 for the user to access the service based on proximity in distance 28 of the current physical location of the user 24 to the predetermined physical location 26. In such embodiments of the invention, the minimal authentication requirements may be no authentication required or partial authentication required based on the user being located within the boundaries of the predetermined physical location 26. In such embodiment of the invention, in which the user gains access to the service by providing the minimal authentication requirements/credentials, the user may be provided access to decreased functionality 34 within the service (i.e., less than full functionality). Decreased functionality may limit the user in terms of the transactions they may conduct within the service, the transaction amounts and/or the information that is accessible to the user during the network session. In such embodiments of the invention, if the user desires full functionality within the service, the user may provide full authentication/requirements credentials.

In further embodiments, the authentication module 18 may be configured to determine a level of authentication 36 from amongst a plurality of levels. Each level may be defined by predetermined distance thresholds 38 from the predetermined physical location 26. The predetermined distance thresholds 38 may vary depending on the type or specificity of the predetermined physical location 26. In specific embodiments of the invention, the levels of authentication 38 may define three levels of authentication, (1) no authentication level; (2) partial/soft authentication level and (3) full authentication.

The no authentication level may be based on the user currently being physically located 24 within the boundaries of predetermined physical location 26. The no authentication level is configured such that the user is not required to provide authentication credentials to access the service. The partial authentication level may be based on (1) the user currently being physically located 24 within the boundaries of the predetermined physical location 26, or (2) the user currently being physically located 24 outside of the predetermined location by a predetermined distance (i.e., first distance threshold). The predetermined distance is typically configured such that it represents a slight deviation from the boundaries of the predetermined physical location 26. The partial authentication level is configured such that the user is required to provide to some but less than full authentication requirements/credentials to access the service. For example, if full authentication credentials (i.e., standard credentials normally required to access the service) comprise a user ID, passcode and identification of a predetermined site key, partial credentials may be limited to user ID or the passcode or a less complex passcode, e.g., a four digit Personal Identification Number (PIN) or the like. The full authentication level may be based on the user currently being physically located 24 outside of the boundaries of predetermined physical area 26 by a predetermined distance. The predetermined distance is typically configured such that it indicates a significant deviation from the boundaries of the predetermined physical location. The full authentication level is configured such that the user is required to provide their designated full set of authentication requirements/credentials (i.e., the authentication requirements required if no other information is known about the user at the time of the request to access the service).

In alternate embodiments of the apparatus, the authentication requirements module 18 is configured to determine a point or location 42 along an authentication continuum 40 based, at least in part, on current location 24 of the user in relation to the boundaries of the predetermined physical location 26. The point or location 42 along the authentication continuum 40 defines the authentication requirements. In this regard, the authentication continuum may comprise a sliding scale such that one end of the continuum defines no authentication and the other end of the continuum defines full authentication. In such embodiments of the apparatus, other factors/attributes known about the user at the time of the request and/or attributes related to the service being accessed or the time of the service request may be used in the determination of the point or location along an authentication continuum 46. In such embodiments of the invention, the point/location along the authentication continuum 46 may be determined objectively (e.g., using distance and time thresholds) or subjectively, implementing heuristics or the like, to determine an optimal point along the authentication continuum based on the totality of information known about the user, the service or the environment at the time of the access request.

In further embodiments of the apparatus 10, the authentication module 18 is configured to determine authentication requirements 30 by determining that the current location of the user 24 is located within one of a plurality of zones of authentication. For example, a first zone of authentication 44 may be defined by the boundaries of the user's place of residence 46 and/or the user's place of business 48. It should be noted that the first zone may further delineated to a specific location within the place of residence (e.g., specific apartment building, room or the like) or a specific location with the place of business (e.g., a specific building or office within a building). The first zone of authentication may define the authentication requirements as either no authentication required or partial authentication (less than full authentication requirements/credentials). In another example, a second zone of authentication 50 may be defined by the residence of an individual associated with the user 52 (e.g., a friend, relative or the like) and/or a place of business consistently frequented by the user 54 (e.g., a grocery store, restaurant or the like). The second zone of authentication may define the authentication requirements as less than full authentication requirements and more than the authentication requirements required in the first zone.

In further embodiments the apparatus includes a service access module 56 that is stored in the memory 14 and is executable by the processor 16. The service access module 56 is configured to determine a level of access 58 available to the user upon the user meeting the determined authentication requirements. The level of access defines functionality available to the user within the service and may be based on the proximity in distance 60 of the current physical location of the user to the predetermined physical location. In such embodiments the determination of the level of access granted to the user may be independent of the determination of authentication requirements. While in other embodiments of the invention, the determination of the level of access may be independent of the determination of the proximity in distance 60 of the current physical location of the user to the predetermined physical location (i.e., the determination of level of access may be based on other factors/attributes related to the user's current state, the current environment/time, and/or the network service being accessed. The level of access may define transactions (or transaction limits) that the user is authorized to conduct or information the user is authorized to access during the session.

Referring to FIG. 3, a block diagram is presented of an apparatus 110 configured to determine a user's authentication requirements/credentials for a specific mobile network access session based on the current location of the user in comparison to a known typical travel route of the user, in accordance with alternate embodiments of the present invention. The apparatus 110 may include any type and/or combination of one or more computing devices. The apparatus 110 is operable to receive and execute modules, routines and applications, such as authentication requirements module 118 and the like.

The apparatus 110 includes computing platform 112 that can receive and execute routines and applications. Computing platform 112 includes memory 114, which may comprise volatile and nonvolatile memory such as read-only and/or random-access memory (RAM and ROM), EPROM, EEPROM, flash cards, or any memory common to computer platforms. Further, memory 114 may include one or more flash memory cells, or may be any secondary or tertiary storage device, such as magnetic media, optical media, tape, or soft or hard disk.

Further, computing platform 112 also includes at least one processor 116, which may be an application-specific integrated circuit ("ASIC"), or other chipset, processor, logic circuit, or other data processing device. Processor 116 or other processor such as ASIC may execute an application programming interface ("API") layer (not shown in FIG. 3) that interfaces with any resident programs, such as authentication requirements module 118 or the like, stored in the memory 114 of apparatus 110. Processor 116 includes various processing subsystems (not shown in FIG. 3) embodied in hardware, firmware, software, and combinations thereof, that enable the functionality of apparatus 110 and the operability of the apparatus on a network. For example, processing subsystems allow for initiating and maintaining communications, and exchanging data, with other networked devices. Additionally, processing subsystems may include any portion of the functionality of authentication requirements module 18 obviating the need for such applications and modules to be stored in the memory.

The memory 114 stores authentication requirements module 118 that is configured to determine a user's authentication requirements/credentials for a specific mobile network access session based on the current location of the user in comparison to a known typical travel route of the user. The authentication requirements module 118 is configured to receive a request 120 for a user to access a network-based service that requires user authentication 122. The user authentication may be required to gain access to the network-service (e.g., an Internet-based service accessible via an application (i.e., "app") executable on a user device, such as a mobile communication device) and/or to conduct a transaction on the network-service.

In response to receiving the request, the module 118 is configured to determine (1) the current physical (i.e., geographic) location 124 of the user and time 126 and (2) that the user of the apparatus is associated with a predetermined travel route 128 having location boundaries 130 and a time period 132. The user is known to the module 118 since the service request is coming from a mobile communication device that is identifiable by procedures discussed previously. As such the module 118 accesses a user profile, or a database of known travel routes, to determine that the user is associated with one or more predetermined travel route. The current physical location 124 of the user may be determined by a location-determining mechanism (e.g., Global Positioning System (GPS) device or the like) in the mobile communication device which sent the service access request or via wireless signals transmitted from the mobile communication device using triangulation methodology or the like.

Once the authentication requirements module 118 has determined that the user is associated with a predetermined travel route 128 and has determined the current physical location of the user 124 and the current time 126, the module 118 is further configured to determine the proximity in distance and time 134 of the current physical location of the user 124 and current time 126 to the predetermined travel route 128 (i.e., the location boundaries 130 and time period 132).

The authentication requirements module 118 is further configured to determine the authentication requirements 136 (i.e., the authentication credentials required by the user) for user to currently access the service based on the proximity in distance and time 134 of the current physical location of the user 124 and current time 126 to the predetermined travel route 128. In specific embodiments of the invention, the authentication requirements are defined by levels of authentication 138. In specific embodiments of the invention, the levels of authentication 138 may define three levels of authentication, (1) no authentication level 140; (2) partial/soft authentication level 142 and (3) full authentication 144.

The no authentication level 140 may be based on the user currently being physically located 124 within the predetermined location boundaries 130 of the travel route 128 and the current time 126 being within the time period 132 of the travel route 128. The no authentication level 140 is configured such that the user is not required to provide authentication credentials to access the service.

The partial authentication level 142 may be based on (1) the user currently being physically located 124 within the predetermined location boundaries 130 of the travel route 128 and the current time 126 being within the time period 132 of the travel route 128 or (2) the user currently being physically located 124 outside of the predetermined location boundaries 130 of the travel route 128 by a predetermined distance and/or the current time 126 being outside of the time period 132 by a predetermined allotted time. The predetermined distance and the predetermined allotted time are typically configured such that they are slight deviations from the location boundaries 130 and time period 132 of the travel route 128. The partial authentication level 140 is configured such that the user is required to provide to some but less than full authentication requirements/credentials to access the service. For example, if full authentication credentials (i.e., standard credentials normally required to access the service) comprise a user ID, passcode and identification of a predetermined site key, partial credentials may be limited to user ID or the passcode or a less complex passcode, e.g., a four digit Personal Identification Number (PIN) or the like.

The full authentication level 144 may be based on (1) the user currently being physically located 124 outside of the location boundaries 130 of travel route 128 by a predetermined distance and/or (2) the current time 126 being outside of the time period 132 of the travel route 128 by a predetermined time. The predetermined distance and the predetermined time are typically configured such that they are significant deviations from the location boundaries 130 and time period 132 of the travel route 128. The full authentication level 144 is configured such that the user is required to provide their designated full set of authentication requirements/credentials (i.e., the authentication requirements required if no other information is known about the user at the time of the request to access the service).

In alternate embodiments of the apparatus, the authentication requirements module 118 is configured to determine a point or location along an authentication continuum 146 based, at least in part, on current location 124 of the user and the current time 126 in relation to the location boundaries 130 and the time period 132 of the travel route 128. The point or location along the authentication continuum defines the authentication requirements. In this regard, the authentication continuum may comprise a sliding scale such that one end of the continuum defines no authentication and the other end of the continuum defines full authentication. In such embodiments of the apparatus, other factors/attributes known about the user at the time of the request and/or attributes related to the service being accessed or the time of the service request may be used in the determination of the point or location along an authentication continuum 146. In such embodiments of the invention, the point/location along the authentication continuum 146 may be determined objectively (e.g., using distance and time thresholds) or subjectively, implementing heuristics or the like, to determine an optimal point along the authentication continuum based on the totality of information known about the user, the service or the environment at the time of the access request.

In further embodiments the apparatus includes a service access module 148 that is stored in the memory 114 and is executable by the processor 116. The service access module 148 is configured to determine a level of access 150 available to the user upon the user providing the determined authentication requirements. The level of access defines functionality available to the user within the service 152 and may be based on the determined authentication requirements or may be determined independent of the determined authentication requirements. Functionality may be a transaction that the user is authorized to conduct or information the user is authorized to access during the session. The determination of the level of access 150 may take into account the proximity in distance and time of the user to the travel route, as well as other information known about the user or the user's current environment at the time of the access request.

Referring to FIG. 4, a block diagram is presented of an apparatus 210 configured to determining user authentication requirements/credentials for a specific mobile network access session based on the current location of the user being within a predefined area requiring altered (i.e., increased or decreased) authentication requirements, in accordance with embodiments of the present invention. The apparatus 210 may include any type and/or combination of one or more computing devices. The apparatus 210 is operable to receive and execute modules, routines and applications, such as authentication requirements module 218 and the like.

The apparatus 210 includes computing platform 212 that can receive and execute routines and applications. Computing platform 212 includes memory 214, which may comprise volatile and nonvolatile memory such as read-only and/or random-access memory (RAM and ROM), EPROM, EEPROM, flash cards, or any memory common to computer platforms. Further, memory 214 may include one or more flash memory cells, or may be any secondary or tertiary storage device, such as magnetic media, optical media, tape, or soft or hard disk.

Further, computing platform 212 also includes at least one processor 216, which may be an application-specific integrated circuit ("ASIC"), or other chipset, processor, logic circuit, or other data processing device. Processor 216 or other processor such as ASIC may execute an application programming interface ("API") layer (not shown in FIG. 4) that interfaces with any resident programs, such as authentication requirements module 18 or the like, stored in the memory 214 of apparatus 210. Processor 216 includes various processing subsystems (not shown in FIG. 4) embodied in hardware, firmware, software, and combinations thereof, that enable the functionality of apparatus 210 and the operability of the apparatus on a network. For example, processing subsystems allow for initiating and maintaining communications, and exchanging data, with other networked devices. Additionally, processing subsystems may include any portion of the functionality of authentication requirements module 18 obviating the need for such applications and modules to be stored in the memory.

Memory 214 stores authentication requirements module 218 that is configured to determine user authentication requirements/credentials for a specific mobile network access session based on the current location of the user being within a predefined area requiring altered (i.e., increased or decreased) authentication requirements. The authentication requirements module 18 is configured to receive a request 220 from a mobile communication device for a user to access a network-based service that requires user authentication 222. The user authentication may be required to gain access to the network-service and/or to conduct a transaction on the network-service.

In response to receiving the request, the module 218 is configured to determine the current physical (i.e., geographic) location 224 of the user. The user is known to the module 18 since the service request is coming from a mobile communication device that is identifiable by procedures discussed previously. The current physical location 224 of the user may be determined by a location-determining mechanism (e.g., Global Positioning System (GPS) device or the like) in the mobile communication device or via wireless signals transmitted from the mobile device using triangulation methodology or the like. In specific embodiments, the determination of the altered authentication requirements may be temporal (i.e., the altered authentication requirements in the predetermined physical area 226 exist only for a predetermined time period). In such embodiments, the module 218 is further configured to determine a current time 34.

Once the authentication requirements module 218 has the current physical location of the user 224, the module 218 is further configured to determine that the current physical location 224 is proximity to or within a predetermined physical area 226 having altered authentication requirements 228. In specific embodiments, certain geographic areas will be predetermined as requiring increased authentication requirements 230 or decreased authentication requirements 232 in comparison to standard authentication requirements used to access the service (i.e., the authentication requirements/credentials typically requested of a user absent any further knowledge about the state of the user). In such embodiments, the increased authentication requirements 230 may include a request for the user to provide further personnel data or answer out-of-wallet challenge questions. The decreased authentication requirements 32 may be that no authentication is required by the user to access the service or partial authentication (i.e., soft authentication) is required. Partial authentication is defined as some form of authentication credentials less than full/standard authentication credentials.

In specific embodiments of the invention, the predetermined physical area 226 may be defined by the service provider 238. For example, if the service provider is a financial institution providing an online or mobile banking service the financial institution may identify certain areas as high risk and require increased authentication requirements 230 in such areas. Examples of such high risk areas include, but are not limited to, areas having historically high rates of fraud 244, areas having unsecured wireless communication 242 and the like. In addition, the service provider may designate as area as requiring altered authentication requirements on a permanent basis or a temporary basis. For example, a service provider may designate a physical area where a heavily attended event is to be held as an area requiring increased authentication requirements for the time period over which the event will be held.

In other specific embodiments of the invention, the predetermined physical area 26 may be defined by the user 240. Such designation by the user may be permanent or temporary. For example, if the user is aware of upcoming travel plans, the user may designate travel routes or specific locations at the travel destination (i.e., hotels, residences, business offices) as areas requiring decreased authentication requirements 232. Further, if the upcoming travel plans are a one-time only occurrence the user may designate the locations as requiring decreased authentication requirements on a temporary basis (i.e., for a time period that expires at the conclusion of the travel period). However, if the travel occurs on a regular and/or ongoing basis (e.g., permanent vacation residence, same business travel destination or the like), the user may designate the locations as requiring decreased authentication requirements on a permanent basis or for designated continual time periods (e.g., certain times of week, month, year, or the like.)

In those embodiments of the invention in which the predetermined physical area 226 has altered authentication requirements 228 during a specified predetermined time period 236 (e.g., on a temporary basis or for designated time periods only), the module 218 is further configured to determine that the current time 234 is within the designate predetermined time period 236, such that the altered authentication requirements 228 designated for the predetermined time period 236 are invoked.

In further embodiments, the authentication module 218 may be configured to determine a level of authentication 246 from amongst a plurality of levels. Each level may be defined by predetermined based on distance threshold from the predetermined physical area 226. The predetermined distance thresholds may vary depending on the type or specificity of the predetermined physical area 226. In specific embodiments of the invention, the levels of authentication 238 may define three levels of authentication, (1) no authentication level; (2) partial/soft authentication level and (3) heightened authentication.

The no authentication level may be based on the user currently being physically located 224 within the boundaries of predetermined physical area 226. The no authentication level is configured such that the user is not required to provide authentication credentials to access the service. The partial authentication level may be based on (1) the user currently being physically located 224 within the boundaries of the predetermined physical location 226, or (2) the user currently being physically located 224 outside of the predetermined location by a predetermined distance. The partial authentication level is configured such that the user is required to provide to some, but less than full, authentication requirements/credentials to access the service. For example, if full authentication credentials (i.e., standard credentials normally required to access the service) comprise a username, and password, partial credentials may be limited to a less complex passcode, e.g., a four digit Personal Identification Number (PIN) or the like. The heightened authentication level may be based on the user currently being physically located 224 within the physical area 226 and may require the user to input additional personal information or answers to out-of-wallet challenge questions.

In further embodiments the apparatus includes a service access module 248 that is stored in the memory 214 and is executable by the processor 216. The service access module 248 is configured to determine a level of access 250 available to the user upon the user meeting the determined authentication requirements. The level of access 250 defines functionality available to the user within the service and may comprise decreased access to functionality 252 (compared to normal functionality) or increased access to functionality 254 (compared to normal functionality). In such embodiments the determination of the level of access 250 granted to the user may be independent of the determination of authentication requirements. The level of access may define transactions (or transaction limits) that the user is authorized to conduct or information the user is authorized to access during the session.

Referring to FIG. 5, a block diagram is presented of an apparatus 310 configured to determining a user's authentication requirements/credentials for a specific service along an authentication continuum based on a current state of the user and/or service attributes, in accordance with embodiments of the present invention. The apparatus 310 may include any type and/or combination of one or more computing devices. In specific embodiments the apparatus may be a server in communication with a mobile communication device or a mobile communication device. The apparatus 310 is operable to receive and execute modules, routines and applications, such as authentication requirements module 318 and the like.

The apparatus 310 includes computing platform 312 that can receive and execute routines and applications. Computing platform 312 includes memory 314, which may comprise volatile and nonvolatile memory such as read-only and/or random-access memory (RAM and ROM), EPROM, EEPROM, flash cards, or any memory common to computer platforms. Further, memory 314 may include one or more flash memory cells, or may be any secondary or tertiary storage device, such as magnetic media, optical media, tape, or soft or hard disk.

Further, computing platform 312 also includes at least one processor 16, which may be an application-specific integrated circuit ("ASIC"), or other chipset, processor, logic circuit, or other data processing device. Processor 316 or other processor such as ASIC may execute an application programming interface ("API") layer (not shown in FIG. 5) that interfaces with any resident programs, such as authentication requirements module 318 or the like, stored in the memory 314 of apparatus 310. Processor 316 includes various processing subsystems (not shown in FIG. 5) embodied in hardware, firmware, software, and combinations thereof, that enable the functionality of apparatus 310 and the operability of the apparatus on a network. For example, processing subsystems allow for initiating and maintaining communications, and exchanging data, with other networked devices. Additionally, processing subsystems may include any portion of the functionality of authentication requirements module 18 obviating the need for such applications and modules to be stored in the memory.

Memory 314 stores authentication requirements module 318 that is determining a user's authentication requirements/credentials for a specific service along an authentication continuum based on a current state of the user and/or service attributes, in accordance with embodiments of the present invention. The authentication requirements module 318 is configured to receive a request 320 from a mobile communication device for a user to perform a function, such as access a network-based service 334 that requires user authentication 322 or conduct a purchase transaction 336 using a debit/credit card or the like.

In response to receiving the request, the module 318 is configured to determine the at least one of current physical state/condition of the user 324 and/or attributes related to the function 326 requiring access. The user is known to the module 318 since the service request is coming from a mobile communication device that is identifiable by procedures discussed previously. The current physical state 324 of the user may be determined by mechanisms disposed in the wireless communication device, such as location-determining mechanisms (Global Positioning System (GPS) device or the like), accelerometers, other sensors or the like. The current state of the user 324 may include but is not limited to, the geographic location of the user 338 (in relation to the mobile communication device), the movement of the user in a specified direction 344, the movement of the user across a predetermined boundary line 342, the change in location direction of the user 340 or the like.

Attributes related to the function 326 may include the type of service being accessed or type of transaction being conducted 346, the time (e.g., time of day, week, month, year or the like) of the access request or transaction 350, the amount of the transaction 352 and the like.

Once the authentication requirements module 318 has determined at least one of the current physical state of the user 324 and/or attributes related to the function 326, the module 18 is further configured to determine a location 330 along an authentication continuum 328 based, at least in part, on at least one of (1) a current physical state/condition of the user 324, or (2) an attribute related to the function 326. The location along the authentication continuum defines the authentication requirements/credentials 332 required for the user to perform the function (i.e., access a service, conduct a transaction or the like). In specific embodiments of the invention, the authentication continuum is a sliding-scale continuum in which one end of the continuum is defined by no authentication required to perform the function, the opposite end of the continuum is defined by either full authentication required, heightened authentication required (i.e., additional authentication requirements beyond standard authentication requirements, e.g., additional personal information from the user or answers to out-of-wallet challenge questions) or no authentication allowed at this time and locations in between vary the degree/amount of authentication requirements required for the user to perform the function.

In specific embodiments of the invention, the location 330 along the authentication continuum 328 is an objective determination based on the at least one of the current physical state/condition of the user 324 and/or inclusion or omission of attributes related to the function 326. In other specific embodiments of the invention, the location 30 along the authentication continuum 328 is determined subjectively 352, implementing heuristics or the like, based on a totality of the current physical state/condition of the user 324, the attributes related to the function 326 and any other conditions/attributes 354 or the like related to the user or the function which may affect the authentication requirements. Conditions/attributes 354 related to the user are those that have an effect on validating the identity of the user and conditions attributes 354 of the function are those that have an effect on the risk involved with the function or providing access to the function.

In further embodiments, the authentication module 318 may be configured to determine a level of authentication 356 from amongst a plurality of levels. Each level may be predetermined based on different authentication requirement criteria related to the state of the user or the attributes of the function. In specific embodiments of the invention, the levels of authentication 338 may define four levels of authentication, (1) no authentication level; (2) partial/soft authentication level, (3) full authentication level, and (4) heightened authentication level.

The no authentication level is configured such that the user is not required to provide authentication credentials to access the service. The partial authentication level is configured such that the user is required to provide to some, but less than full, authentication requirements/credentials to access the service. For example, if full authentication credentials (i.e., standard credentials normally required to access the service) comprise a username, and password, partial credentials may be limited to a less complex passcode, e.g., a four digit Personal Identification Number (PIN) or the like. The full authentication level is configured such that standard/normal authentication requirements/credentials are required for the user to perform the function. The heightened authentication level may require the user to input additional personal information or answers to out-of-wallet challenge questions.

In further embodiments the apparatus includes a function level module 358 that is stored in the memory 314 and is executable by the processor 316. The function level module 358 is configured to determine a level of functionality 360 available to the user upon the user meeting the determined authentication requirements. The level of functionality 360 defines functions available 362 to the user within the service may be independent of the determination of authentication requirements. The level of functionality 360 may define transactions (or transaction amount limits 364) that the user is authorized to conduct or information the user is authorized to access during the session.

FIG. 6 is a flow diagram depicting a method 400 for determining a user's authentication requirements/credentials for a specific network access session based on the current location of the user in comparison to a user's normal boundary of location, in accordance with embodiments of the present invention, in accordance with embodiments of the present invention. At Event 402, a request is received for a user to access a network-based service that requires user authentication. The user authentication may be required to gain access to the network-service (e.g., an Internet-based service accessible via an application (i.e., "app") executable on a user device, such as a mobile communication device) and/or to conduct a transaction on the network-service.

At Event 404, in response to receiving the request, a determination is made as to the current physical (i.e., geographic) location of the user. The current physical location of the user may be determined by a location-determining mechanism (e.g., Global Positioning System (GPS) device or the like) in the mobile communication device which sent the service access request or via wireless signals transmitted from the mobile communication device using triangulation methodology or the like.

At Event 406, once the determination is made of the current physical location of the user, a determination is made of the proximity in distance and time of the current physical location of the user and current time to a predetermined physical location associated with the user. As previously noted, the user is known to the module since the service request is coming from a mobile communication device that is identifiable by procedures discussed previously. As such the module accesses a user profile or the like to determine that the user is associated with one or more predetermined physical locations.

At Event 408, authentication requirements/credentials for the user to currently use as means to access the service are determined based on the proximity in distance of the current physical location of the user to the predetermined physical location. The authentication requirements/credentials determined may dictate that the user provide no authentication credentials to access the service, partial/soft authentication credentials or full authentication credentials based on the proximity in distance and/or time of the user to the predetermined physical location.

Thus, systems, apparatus, methods, and computer program products described above provide for determining a user's authentication requirements/credentials for a specific network access session based on the current location of the user in comparison to known boundaries of location associated with the user, such as the user's residence, place of business or the like. As such, the present invention serves to expedite the process for authenticating a user who desires to gain access to a network service, such as a banking application or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for determining user authentication requirements, the apparatus comprising:
   a computing platform including a memory and a processor in communication with the memory; and
   an authentication requirements module stored in the memory, executable by the processor and configured to, store a geographic area and a period of time associated with the geographic area, wherein the geographic area and the period of time are dynamically defined by a provider of a service available on the apparatus;

receive a request for a user to access the service, wherein the service requires authentication prior to the user accessing the service, in response to receiving the request, determine a current physical location of the apparatus and a current time, and in response to determining that (1) the apparatus is currently located within the geographic area, and (2) the current time is within the period of time, request the user to provide increased authentication credentials, wherein the increased authentication credentials include authentication credentials that differ from standard authentication credentials, wherein the user is provided access to the service in response to the user inputting the increased authentication credentials.

2. The apparatus of claim 1, wherein the authentication requirements module is further configured to, in response to determining at least one of (1) the apparatus is currently located outside of the geographic area, (2) the current time is outside of the period of time, determine a level of authentication required for the user to access the service based on the proximity in at least one of (i) distance and (ii) time of the current physical location of the user to the geographic location or the period of time, wherein the level of authentication is from amongst a plurality of levels of authentication.

3. The apparatus of claim 2, wherein the authentication requirements module is further configured to determine the level of authentication required based on the proximity in at least one of (i) distance and (ii) time of the current physical location of the user to the geographic location or the period of time, wherein each level of authentication is defined by at least one of a predetermined distance threshold from the geographic location or a predetermined time threshold from the period of time.

4. The apparatus of claim 1, wherein the authentication requirements module is further configured to determine a point along an authentication continuum based on the proximity in at least one of (i) distance and (ii) time of the current physical location of the user to the geographic location or the period of time, wherein the point along the authentication continuum corresponds to predetermined authentication credentials.

5. The apparatus of claim 1, further comprising a service access module stored in the memory, executable by the processor and configured to determine a level of access available to the user of the service upon the user providing the determined authentication requirements, wherein the level of access defines functionality available to the user within the service based on the increased authentication credentials required, wherein the level of access is granted to the user in response to the user providing the increased authentication credentials.

6. A method for determining user authentication requirements, the method comprising:

store a geographic area and a period of time associated with the geographic area, wherein the geographic area and the period of time are dynamically defined by a provider of a service available on the apparatus;

receiving, by a computing device, a request for a user to access the service, wherein the service requires authentication prior to the user accessing the service;

in response to receiving the request, determining, by a computing device processor, a current physical location of the apparatus and a current time;

in response to determining that (1) the apparatus is currently located within the geographic area, and (2) the current time is within the period of time, requesting, by a computing device processor, the user to provide increased authentication credentials, wherein the increased authentication credentials include authentication credentials that differ from standard authentication credentials, wherein the user is provided access to the service in response to the user inputting the increased authentication credentials.

7. The method of claim 6, further comprising, in response to determining at least one of (1) the apparatus is currently located outside of the geographic area, (2) the current time is outside of the period of time, determining, by the computing device processor, a level of authentication required for the user to access the service based on the proximity in at least one of (i) distance and (ii) time of the current physical location of the user to the geographic location or the period of time, wherein the level of authentication is from amongst a plurality of levels of authentication.

8. The method of claim 7, wherein determining the level of authentication further comprises determining, by a computing device processor, the level of authentication required based on the proximity in at least one of (i) distance and (ii) time of the current physical location of the user to the geographic location or the period of time, wherein each level of authentication is defined by at least one of a predetermined distance threshold from the geographic location or a predetermined time threshold from the period of time.

9. The method of claim 6, further comprising determining, by the computing device processor, a point along an authentication continuum based on the proximity in at least one of (i) distance and (ii) time of the current physical location of the user to the geographic location or the period of time, wherein the point along the authentication continuum corresponds to predetermined authentication credentials.

10. The method of claim 6, further comprising determining, by a computing device processor, a level of access available to the user of the service upon the user providing the determined authentication requirements, wherein the level of access defines functionality available to the user within the service based on the increased authentication credentials required, wherein the level of access is granted to the user in response to the user providing the increased authentication credentials.

11. A computer program product comprising:

a non-transitory computer-readable medium comprising:

a first set of codes for causing a computer to store a geographic area and a period of time associated with the geographic area, wherein the geographic area and the period of time are dynamically defined by a provider of a service available on the apparatus;

a second set of codes for causing a computer to receive a request for a user to access the service, wherein the service requires authentication prior to the user accessing the service;

a third set of codes for causing a computer to, in response to receiving the request, determine a current physical location of the apparatus and a current time; and a fourth set of codes for causing a computer to, in response to determining that (1) the apparatus is currently located within the geographic area, and (2)

the current time is within the period of time, requesting, by a computing device processor, the user to provide increased authentication credentials, wherein the increased authentication credentials include authentication credentials that differ from standard authentication credentials, wherein the user is provided access to the service in response to the user inputting the increased authentication credentials.

12. The computer program product of claim 11, further comprising a fifth set of codes configured to cause the computer to, in response to determining at least one of (1) the apparatus is currently located outside of the geographic area, (2) the current time is outside of the period of time, determine a level of authentication required for the user to access the service based on the proximity in at least one of (i) distance and (ii) time of the current physical location of the user to the geographic location or the period of time, wherein the level of authentication is from amongst a plurality of levels of authentication.

13. The computer program product of claim 12, wherein the fifth set of codes is further configured to cause the computer to determine the level of authentication required based on the proximity in at least one of (i) distance and (ii) time of the current physical location of the user to the geographic location or the period of time, wherein each level of authentication is defined by at least one of a predetermined distance threshold from the geographic location or a predetermined time threshold from the period of time.

14. The computer program product of claim 11, further comprising a fifth set of codes configured to cause the computer to determine a point along an authentication continuum based on the proximity in at least one of (i) distance and (ii) time of the current physical location of the user to the geographic location or the period of time, wherein the point along the authentication continuum corresponds to predetermined authentication credentials.

15. The computer program product of claim 11, further comprising a fifth set of codes for causing a computer to determine a level of access available to the user of the service upon the user providing the determined authentication requirements, wherein the level of access defines functionality available to the user within the service based on the increased authentication credentials required, wherein the level of access is granted to the user in response to the user providing the increased authentication credentials.

\* \* \* \* \*